United States Patent
Kominato et al.

(10) Patent No.: US 9,812,852 B2
(45) Date of Patent: Nov. 7, 2017

(54) GROMMET AND METHOD FOR MANUFACTURING SAME

(71) Applicant: Yazaki Corporation, Minato-ku, Tokyo (JP)

(72) Inventors: Yasuhiro Kominato, Susono (JP); Shingo Kato, Susono (JP); Gaku Ito, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/449,131

(22) Filed: Mar. 3, 2017

(65) Prior Publication Data

US 2017/0179703 A1 Jun. 22, 2017

Related U.S. Application Data

(63) Continuation of application No. PCT/JP2015/076366, filed on Sep. 16, 2015.

(30) Foreign Application Priority Data

| Sep. 16, 2014 | (JP) | ................................. | 2014-187832 |
| Feb. 25, 2015 | (JP) | ................................. | 2015-035531 |
| Apr. 15, 2015 | (JP) | ................................. | 2015-083634 |
| Jun. 29, 2015 | (JP) | ................................. | 2015-130121 |
| Aug. 3, 2015 | (JP) | ................................. | 2015-153460 |

(51) Int. Cl.
  *H02G 3/22* (2006.01)
  *H01B 7/00* (2006.01)
  *H01B 3/28* (2006.01)
  *H01B 19/00* (2006.01)

(52) U.S. Cl.
  CPC ................. *H02G 3/22* (2013.01); *H01B 3/28* (2013.01); *H01B 7/0045* (2013.01); *H01B 19/00* (2013.01)

(58) Field of Classification Search
  CPC combination set(s) only.
  See application file for complete search history.

(56) References Cited

U.S. PATENT DOCUMENTS 8,502,079 B2 * 8/2013 Shitamichi .......... B60R 16/0222
  16/2.1

FOREIGN PATENT DOCUMENTS

| JP | S50-117801 U | 9/1975 |
| JP | H01-081820 U | 5/1989 |
| JP | H04-078718 U | 7/1992 |
| JP | H10-248141 A | 9/1998 |
| JP | H10-252951 A | 9/1998 |
| JP | H11-122756 A | 4/1999 |

(Continued)

OTHER PUBLICATIONS

Nov. 2, 2015—International Search Report—Intl App PCT/JP2015/076366.
Nov. 22, 2016—(JP) Office Action—App 2015-035531.

*Primary Examiner* — Dhirubhai R Patel
(74) *Attorney, Agent, or Firm* — Banner & Witcoff, Ltd.

(57) ABSTRACT

A grommet is secured to a wire harness inserted in an opening of a panel. The grommet is fitted in the opening and mounted, thereby supporting the wire harness in the panel, The grommet has: partition walls covering the periphery of the wire harness and forming a sound-blocking space around the wire harness; and a sound-insulating wall formed inside the sound-blocking space so as to intersect the longitudinal direction of the wire harness.

9 Claims, 19 Drawing Sheets

(56) References Cited

FOREIGN PATENT DOCUMENTS

| | | |
|---|---|---|
| JP | H11-248044 A | 9/1999 |
| JP | 2000-059957 A | 2/2000 |
| JP | 2001-153270 A | 6/2001 |
| JP | 2002-027641 A | 1/2002 |
| JP | 2002-058142 A | 2/2002 |
| JP | 2005-324613 A | 11/2005 |
| JP | 2012-125002 A | 6/2012 |
| JP | 2014-050153 A | 3/2014 |

* cited by examiner

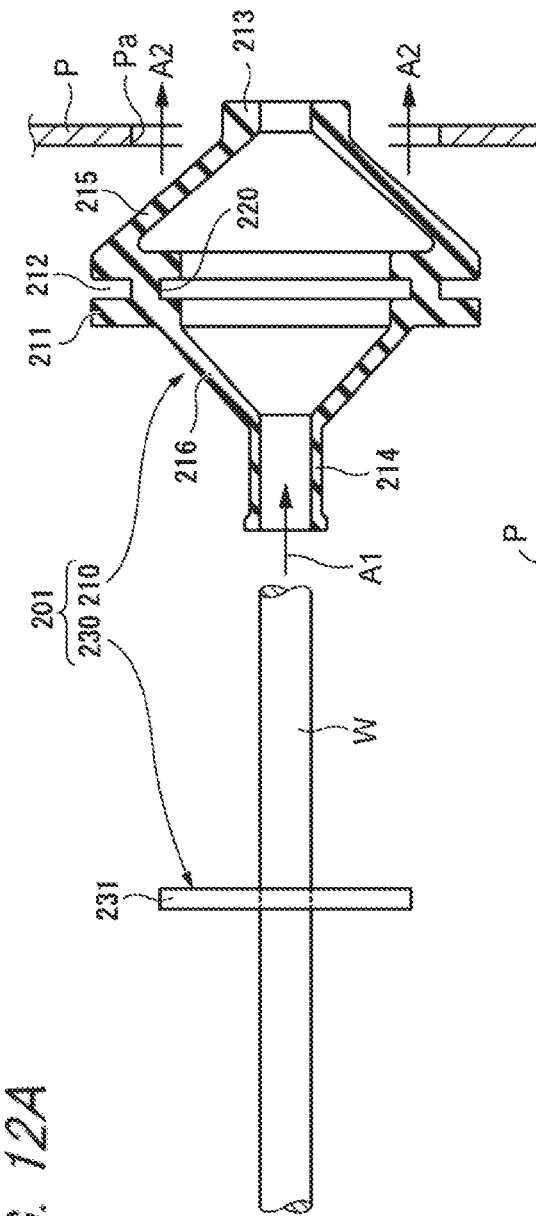
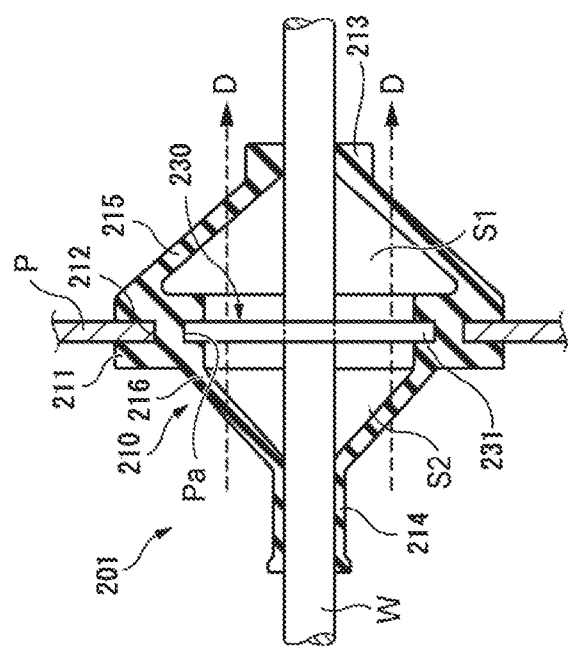
FIG. 12A
FIG. 12B

GROMMET AND METHOD FOR MANUFACTURING SAME

CROSS REFERENCE TO RELATED APPLICATIONS

This application is a continuation of PCT application No. PCT/JP2015/076366, which was filed on Sep. 16, 2015 based on Japanese Patent Application No. 2014-187832 filed on Sep. 16, 2014, Japanese Patent Application No. 2015-035531 filed on Feb. 25, 2015, Japanese Patent Application No. 2015-083634 filed on Apr. 15, 2015, Japanese Patent Application No. 2015-130121 filed on Jun. 29, 2015, and Japanese Patent Application No. 2015-153460 filed on Aug. 3, 2015, whose contents are incorporated herein by reference. Also, all the references cited herein are incorporated as a whole.

BACKGROUND OF THE INVENTION

1. Technical Field

The present invention relates to a grommet by which a wire harness passed through an opening portion of a panel can be supported in the panel, and a method for manufacturing the grommet.

2. Background Art

A grommet in which an air layer is formed internally has been known as a grommet by which a wire harness passed through an opening portion of a panel can be supported in the panel (e.g. see Patent Literatures JP-A-2012-125002, JP-A-2001-153270, JP-A-2014-50153 and JP-A-2002-27641).

SUMMARY

As described above, the grommet provided with the air layer can use the air layer to suppress transmitted sound transmitted through the grommet. However, in order to enhance a soundproof effect, it is necessary to either increase the volume of the air layer or increase the thickness of a circumferential wall forming the air layer. This leads to an increase in the size of the grommet.

The invention has been accomplished in consideration of the aforementioned circumstances. An object of the invention is to provide a grommet which can enhance a soundproof effect without causing an increase in size, and a method for manufacturing the grommet.

In order to achieve the foregoing object, the grommet and the method for manufacturing the same according to the invention are characterized in the following items (1) to (9).
(1) A grommet which is fixed to a wire harness to be inserted through an opening portion of a panel, and which is then fitted and mounted in the opening portion so that the wire harness is supported in the panel, the grommet including:
   a panel fixation portion mounted in the opening portion of the panel,
   a circumferential wall which covers the circumference of the wire harness to thereby form a sound insulation space around the wire harness; and
   a soundproof wall which is formed inside the sound insulation space so as to intersect with a longitudinal direction of the wire harness,
   wherein: the soundproof wall or walls have a through hole or through holes penetrated by the wire harness, and the wire harness and the through hole or through holes are brought into tight contact with each other, and
   an outer circumference of the soundproof wall and the through hole or through holes are positioned at an inner circumferential side of the panel fixation portion.
(2) A grommet according to item (1), wherein: a plurality of the soundproof walls are formed in parallel at intervals.
(3) A grommet according to item (2), wherein: a sound absorbing material is provided among the soundproof walls.
(4) A grommet according to item (1), further including:
   a long cylinder portion which is mounted on an outer circumference of the wire harness; wherein:
   a pair of the circumferential walls which are formed into conical shapes having diameters gradually smaller as their distances from the panel fixation portion mounted in the opening portion of the panel are larger are provided on axially opposite sides of the panel fixation portion;
   inner circumferential ends of the circumferential walls separated at maximum distances from the panel fixation portion are disposed adjacently to an outer circumference of the long cylinder portion in a non-contact state so that the sound insulation space can be defined between the long cylinder portion and the circumferential walls; and
   an outer circumferential end of the soundproof wall is connected to an inner circumference of the panel fixation portion and an inner circumferential end of the soundproof wall is connected to the outer circumference of the long cylinder portion, so that the sound insulation space is divided axially by the soundproof wall.
(5) A grommet according to item (4), wherein: the soundproof wall is formed as an annular corrugated wall.
(6) A grommet according to item (1), wherein:
   the sound insulation space is divided into a plurality of sections in an axial direction by the soundproof wall or walls; and
   all cancellation frequencies at which sound waves can cancel each other due to reflection in the axial direction within the divided sound insulation space sections are included in a target frequency band of sound waves to be attenuated.
(7) A method for manufacturing a grommet according to item (1), wherein:
   an internal mold for molding an internal shape of the grommet is axially divided into two parts with the soundproof wall as a boundary, one internal mold part of the divided two internal mold parts is removed toward one side relatively to the molded grommet after the grommet is molded, and the other internal mold part of the divided two internal mold parts is removed toward the other side relatively to the molded grommet.
(8) A grommet including:
   a large diameter cylinder portion which is provided with a panel engagement portion at its outer circumference, the panel engagement portion being engaged with an inner circumferential edge of a through hole of a panel;
   two small diameter cylinder portions which are disposed on axially opposite sides of the large diameter cylinder portion and tightly fitted to an outer circumference of a cable passed through the through hole respectively; and
   two coupling shield walls which have outer circumference edges connected to the large diameter cylinder portion and inner circumferential edges connected to the small diameter cylinder portions, so that the coupling shield walls shield annular spaces between the large diameter cylinder portion and the small diameter cylinder portions respectively;
   the large diameter cylinder portion, the two small diameter cylinder portions, and the two coupling shield walls forming a grommet body, which is made of an elastic material; wherein:

a sound insulation plate which is formed separately from the grommet body and tightly fitted to the outer circumference of the cable is disposed inside the grommet body to thereby partition the inside of the grommet body into a plurality of hermetically sealed spaces;

an annular fitting groove is formed internally in the grommet body, and an outer circumferential edge of the sound insulation plate integrated with the cable is fitted to the fitting groove; and the fitting groove is provided in an inner circumferential side position corresponding to the panel engagement portion.

(9) A grommet which is fixed to a wire harness to be inserted through a through hole of a panel, and which is fitted into the through hole so as to be mounted in the panel so that the wire harness is supported in the panel, the grommet including:

a large diameter cylinder portion which is provided with a panel fixation portion fixed to the through hole of the panel;

two coupling shield walls which extend from the large diameter cylinder portion toward axially opposite sides to have diameters gradually smaller as their distances from the large diameter cylinder portion are larger so that, of the two coupling shield walls, inner circumferential ends of which are consequently small in diameter are disposed adjacently to or in tight contact with an outer circumference of the wire harness, and which therefore define a sound insulation space around the wire harness;

an inner cylinder portion which has at least one axial side end portion inserted into a corresponding one of the inner circumferential ends of the coupling shield walls and which is tightly fitted to the outer circumference of the wire harness; and a sound insulation wall which is provided inside the sound insulation space and which has an outer circumferential end coupled to an inner circumference of the large diameter cylinder portion or to an inner circumference of one of the coupling shield walls close to the inner circumference of the large diameter cylinder portion, and an inner circumferential end coupled to the inner cylinder portion so that the sound insulation wall can define the sound insulation space axially; wherein:

a water sealing portion is provided partially on one side of the panel fixation portion in the inner cylinder portion so that gaps among electric wires of the wire harness to which the inner cylinder portion is tightly fitted and a gap between the electric wires and an inner circumference of the inner cylinder portion is sealed with a water sealant in the water sealing portion.

In the grommet which is configured according to the aforementioned item (1), sound transmitted from one surface side of the panel toward the other surface side of the panel through the opening portion of the panel can be reduced by the sound insulation space, and further reduced greatly by the soundproof wall. When, for example, the grommet is provided in a dash panel of a vehicle, sound inside an engine room can be surely suppressed from being transmitted to a cabin of the vehicle through the opening portion.

Thus, it is possible to enhance a soundproof effect greatly without increasing the size and it is also possible to suppress material cost, in comparison with a grommet in which a sound insulation space is enlarged or thickness of a circumferential wall is increased in order to enhance a soundproof effect. In addition, it is also possible to prevent mounting work from being complicated due to an increase in the thickness of the partition wall.

In addition, it is possible to prevent transmitted sound from leaking between the through hole or holes of the soundproof wall or walls and the wire harness, and it is possible to surely obtain a soundproof effect by the soundproof wall or walls.

In the grommet which is configured according to the aforementioned item (2), the plurality of soundproof walls are provided. Accordingly, it is possible to obtain a higher soundproof effect.

In the grommet which is configured according to the aforementioned item (3), it is possible to absorb transmitted sound by the sound absorbing material provided among the soundproof walls, and it is possible to obtain a further higher soundproof effect.

In the grommet which is configured according to the aforementioned item (4), the inner circumferential ends of the pair of circumferential walls which are formed into conical shapes are disposed adjacently to the outer circumference of the long cylinder portion in a non-contact state. The long cylinder portion is mounted on the outer circumference of the wire harness. Accordingly, it is possible to reduce intrusion of external sound into the sound insulation space so that it is possible to increase sound insulation properties. In addition, the outer circumferential end and the inner circumferential end of the soundproof wall disposed inside the sound insulation space are connected to the inner circumference of the panel fixation portion and the outer circumference of the long cylinder portion respectively. Accordingly, the sound insulation space can be divided airtightly, so that transmitted sound can be prevented from leaking among the divided space sections. Thus, it is possible to surely obtain a soundproof effect by the soundproof wall.

In the grommet which is configured according to the aforementioned item (5), the soundproof wall is formed as an annular corrugated wall. Accordingly, incident sound striking against the corrugated wall is reflected and diffused. Consequently, waves of the incident sound and waves of the reflected sound cancel each other actively. Thus, sound insulation properties are enhanced. In addition, it is possible to enhance a sound reduction effect by the soundproof wall even without particularly increasing thickness of the soundproof wall.

In the grommet which is configured according to the aforementioned item (6), all cancellation frequencies of the divided sound insulation space sections are included in a target frequency band to be attenuated. Accordingly, it is possible to effectively suppress transmission of the sound in the target frequency band.

In the method for manufacturing the grommet, which is configured according to the aforementioned item (7), the molded soundproof wall does not become an obstacle, but the divided internal mold parts can be relatively removed from the grommet. Accordingly, it is possible to easily mold the grommet having an integral structure including the soundproof wall.

In the grommet which is configured according to the aforementioned item (8), the sound insulation plate is formed separately from the grommet body. Accordingly, it is unnecessary to integrally mold a sound insulation collar portion (sound insulation wall) with the grommet body as in a background-art example. Accordingly, molding can be performed easily and mold removal (mold release) when the grommet body is molded can be made easy. In addition, since the sound insulation plate is separate from the grommet body, the sound insulation plate can be formed so that sufficient sound insulation properties can be exerted. For example, it is possible to select the material, the shape including thickness, etc. of the sound insulation plate desirably. Accordingly, the degree of freedom for design is large, and it is possible to improve the sound insulation properties. In addition, the sound insulation plate is configured to be fitted into the fitting groove in the inner circumference of the grommet body. Accordingly, it is possible to position and fix the sound insulation plate surely so that there is no fear that the sound insulation plate may be displaced or detached during attachment of the grommet etc. Accordingly, it is possible to exert high sound insulation performance which is always stable. In addition, it is possible to dispose the sound insulation plate in the position of the panel. Accordingly, it is possible to block almost the whole of the opening region of the through hole of the panel with the sound insulation plate, so that it is possible to improve soundproof performance more greatly.

In the grommet which is configured according to the aforementioned item (9), it is possible to secure the sound insulation space (air layer) having a large volume around the wire harness. Accordingly, it is possible to enhance sound insulation properties. In addition, the sound insulation wall is provided inside the sound insulation space. Accordingly, it is possible to reduce transmitted sound which is transmitted through the two coupling shield walls and the sound insulation wall to intend to move from an environment on one side of the panel toward an environment on the other side of the panel. Thus, it is possible to enhance the sound insulation properties more greatly. In addition, since the inner cylinder portion and the inner circumferential ends of the coupling shield walls make tight contact with each other, the sound insulation space can be closed at least partially. Accordingly, it is possible to further improve the sound insulation properties. In addition, since the water sealing portion is provided in the inner cylinder portion, it is possible to prevent intrusion of moisture from the environment on the one side of the panel toward the environment on the other side of the panel through the gaps among the electric wires of the wire harness. Moreover, it is also possible to prevent intrusion of sound through the gaps among the electric wires, and it is also possible to contribute to an improvement in the sound insulation properties.

Advantageous Effect of Invention

According the invention, it is possible to provide a grommet which can enhance a soundproof effect without increasing the size.

The invention has been described briefly above. Further, when undermentioned modes (hereinafter referred to as "embodiments") for carrying out the invention are read through with reference to the accompanying drawings, details of the invention can be made further clear.

BRIEF DESCRIPTION OF THE DRAWINGS

FIGS. 4A to 4C are views for explaining soundproof effects generated by soundproof walls, in which FIGS. 4A to 4C are respective schematic sectional views of the soundproof walls.

FIGS. 10A and 10B are views for explaining principles in the case where an axial length of a sound insulation space is set, in which FIG. 10A is a view showing a condition when the sound insulation space (an air column is a model) carries out a resonance amplification function on a sound having a wavelength λ, and FIG. 10B is a view showing a condition when the sound insulation space (the air column is the model) carries out a cancellation function on the sound having the wavelength λ.

FIGS. 12A and 12B are configuration views of a grommet according to a third embodiment of the invention, FIG. 12A being a sectional view showing a state in which the grommet has not been attached, FIG. 12B being a sectional view showing a state in which the grommet has been attached.

DETAILED DESCRIPTION OF EMBODIMENTS

Embodiments concerned with the invention will be described below by way of example with reference to the drawings.

First Embodiment

Figure 1:
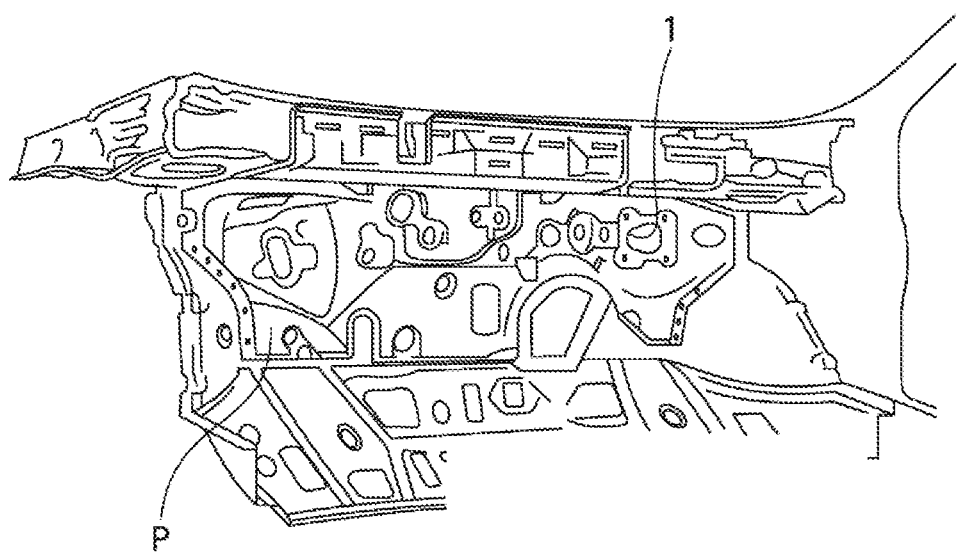
FIG. 1 is a perspective view of a dash panel where a grommet can be mounted.
Figure 2:
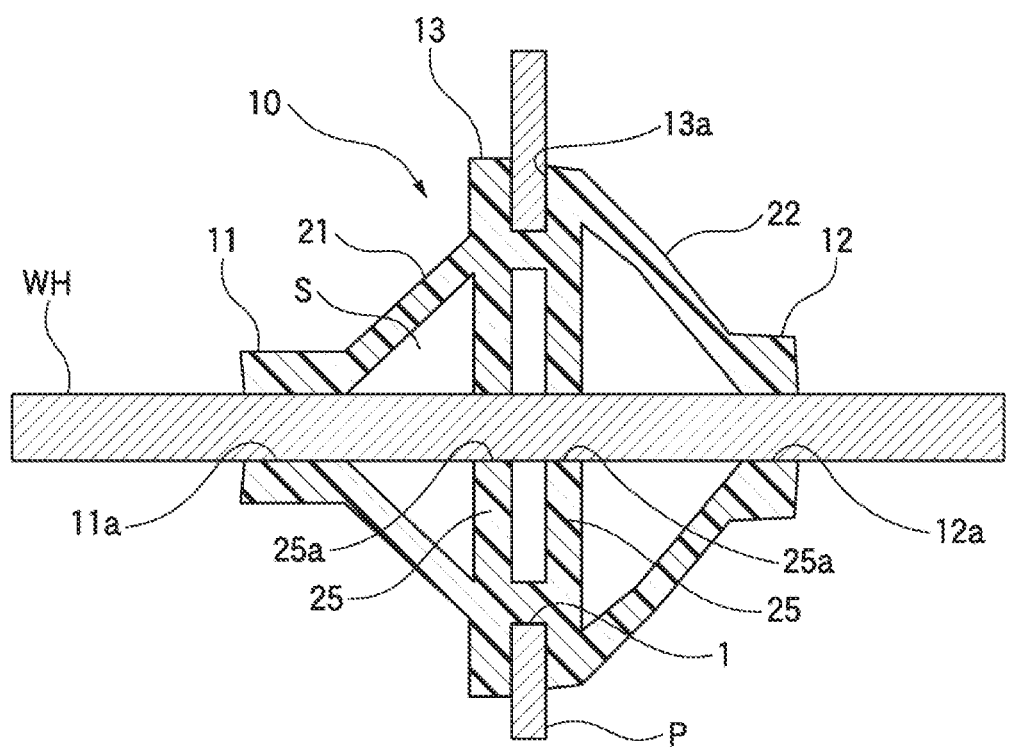
FIG. 2 is a sectional view of a grommet according to a first embodiment.

FIG. 1 is a perspective view of a dash panel where a grommet can be mounted. FIG. 2 is a sectional view of a grommet according to a first embodiment of the invention.

As shown in FIG. 1 and FIG. 2, the grommet 10 according to the first embodiment is mounted in a panel P such as a dash panel of a vehicle such as a car. The panel P is provided between an engine room and a cabin of the vehicle. An opening portion 1 is formed in the panel P. A wire harness WH is inserted through the opening portion 1. Thus, the wire harness WH is wired to pass through the front and back of the panel P. For example, the wire harness WH has a configuration in which an electric wire bundle is passed through a tube-like jacket.

The grommet 10 is made of an elastic material such as rubber or elastomer. The grommet 10 is formed into a circular shape in plan view (as seen from an axial direction). The grommet 10 has harness fixation portions 11 and 12 at its axially opposite end portions, and a panel fixation portion 13 at its axially intermediate portion. The harness fixation portions 11 and 12 are disposed at an interval from each other. The panel fixation portion 13 is disposed substantially in the center between these harness fixation portions 11 and 12. The harness fixation portion 11, 12 has a harness inserting hole 11a, 12a. The wire harness WH is inserted through the harness inserting holes 11a and 12a.

The panel fixation portion 13 has an engagement groove 13a extending circumferentially. An edge portion of the opening portion 1 of the panel P is engaged with the engagement groove 13a. Thus, the grommet 10 is mounted in the panel P.

In the grommet 10, each harness fixation portion 11, 12 and the panel fixation portion 13 are coupled to each other by a corresponding partition wall (circumferential wall) 21, 22. Each of the partition walls 21 and 22 is shaped into a conical shape which is tapered from the panel fixation portion 13 toward the corresponding harness fixation portion 11, 12. In the grommet 10, a space portion surrounded by the partition walls 21 and 22 is formed as a sound insulation portion S.

The grommet 10 has two soundproof walls 25 inside the sound insulation space S. These soundproof walls 25 are formed integrally with an inner circumferential side of the panel fixation portion 13 which serves as an engagement portion engaged with the edge portion of the opening portion 1 when the grommet 10 is fitted in the opening portion 1. The soundproof walls 25 are disposed to intersect with a longitudinal direction (axial direction) of the wire harness WH. These soundproof walls 25 are disposed with a gap therebetween. The sound insulation space S surrounded by the partition walls 21 and 22 is divided into a plurality of sections by the soundproof walls 25.

A through hole 25a is formed in each of the soundproof walls 25. The wire harness WH is inserted through these through holes 25a. Inner circumferential portions of the through holes 25a are brought into tight contact with an outer circumferential surface of the wire harness WH without leaving any gap therebetween.

The aforementioned grommet 10 is fitted into the opening portion 1 of the panel P to bring the edge portion of the opening portion 1 into engagement with the engagement groove 13a. In this manner, the grommet 10 is mounted in the panel P. Thus, the wire harness WH is supported in the panel P by the grommet 10. When the grommet 10 is fitted in the opening portion 1 of the panel P in this manner, the opening portion 1 is blocked with the grommet 10.

The grommet 10 has the sound insulation space S. Further, the grommet 10 has the soundproof walls 25 inside the sound insulation space S. Accordingly, sound of the engine room can be reduced by the sound insulation space S, and further reduced by the soundproof walls 25 greatly. Thus, it is possible to suppress the sound of the engine room from being transmitted to the cabin of the vehicle through the opening portion 1.

A grommet 100 according to a reference example will be described here.

Figure 3:
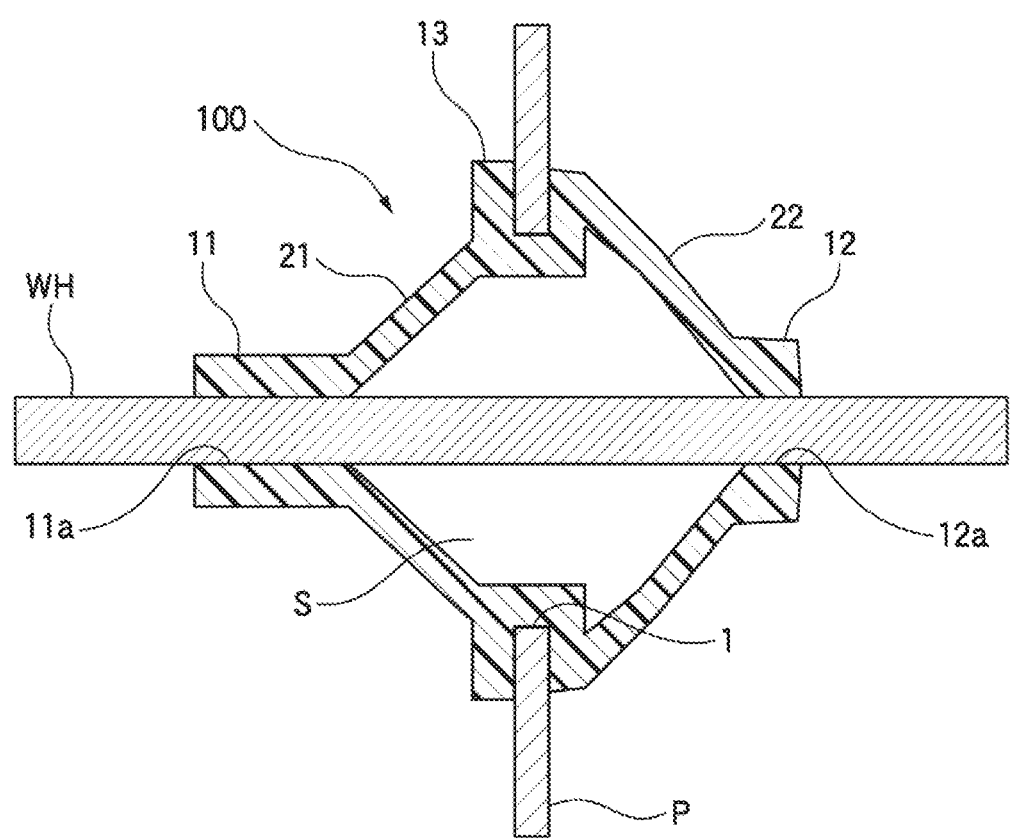
FIG. 3 is a sectional view of a grommet according to a reference example.

FIG. 3 is a sectional view of the grommet according to the reference example.

As shown in FIG. 3, no soundproof wall 25 is provided inside a sound insulation space S in the grommet 100 according to the reference example. In the grommet 100, sound of an engine room can be reduced by the sound insulation space S, but any soundproof effect by the soundproof wall 25 cannot be obtained.

In the grommet 100 having such a structure, the soundproof effect can be enhanced slightly when the sound insulation space S is enlarged or thickness of each of partition walls 21 and 22 is increased. However, when the sound insulation space S is enlarged or the thickness of the partition walls 21, 22 is increased, the size of the grommet 100 increases inevitably and material cost also increases. Moreover, when the thickness of the partition walls 21, 22 is increased, elastic deformation of the grommet 100 becomes difficult, and work for mounting the grommet 100 into the opening portion 1 of the panel P is complicated.

On the other hand, according to the grommet 10 according to the embodiment, the soundproof walls 25 are formed. Accordingly, the soundproof effect can be enhanced greatly without enlarging the sound insulation space S or increasing the thickness of each of the partition walls 21 and 22. That is, without causing an increase in the size by enlarging the sound insulation space S or by increasing the thickness of the partition walls 21, 22, the soundproof effect can be enhanced greatly and material cost can be also suppressed. In addition, mounting work can be prevented from being complicated due to the increase in the thickness of the partition walls 21, 22.

In addition, a plurality of soundproof walls 25 are formed in parallel at intervals. Accordingly, it is possible to obtain a high soundproof effect by the plurality of soundproof walls 25.

Moreover, the soundproof walls 25 are formed on the inner circumferential side in the panel fixation portion 13 which is an engagement portion with which the edge portion of the opening portion 1 can be brought into engagement when the grommet 10 is fitted into the opening portion 1. Accordingly, transmitted sound to be transmitted through the grommet 10 passes through the soundproof walls 25 surely. Thus, it is possible to obtain the soundproof effect surely by the soundproof walls 25.

In addition, the wire harness WH are brought into tight contact with the through holes 25a. Accordingly, it is possible to prevent leakage of transmitted sound between the through holes 25a of the soundproof walls 25 and the wire harness WH, so that it is possible to obtain the soundproof effect by the soundproof walls 25 surely.

Incidentally, the aforementioned embodiment has been described by way of example in the case where two soundproof walls 25 are provided. However, the number of the soundproof walls 25 may be one or may be three or more. In addition, when the number of soundproof walls 25 is increased, it is possible to obtain a higher soundproof effect.

Specific soundproof effects will be described below.

Figure 4A:
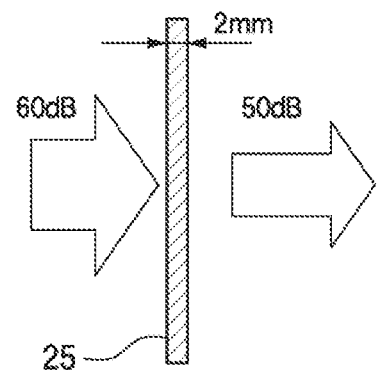
Figure 4B:
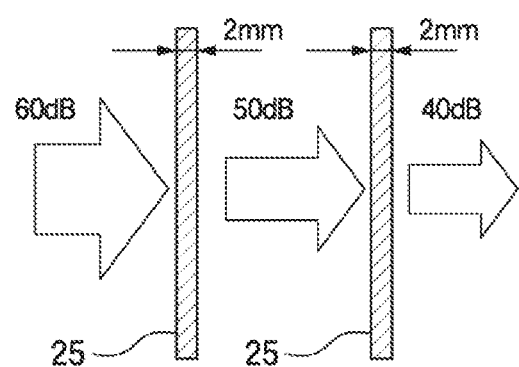
Figure 4C:
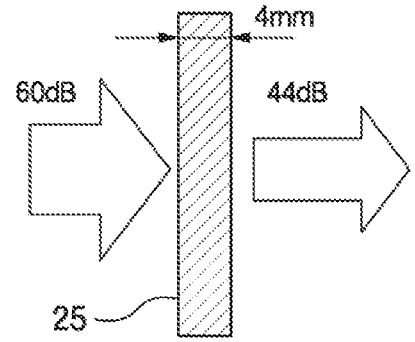

FIGS. 4A to 4C are views for explaining the soundproof effects obtained by soundproof walls. FIGS. 4A to 4C are respective schematic sectional views of the soundproof walls.

As shown in FIG. 4A, a 2 mm-thick soundproof wall 25 has a 10 dB-reduction soundproof effect to reduce a 60 dB sound to 50 dB. When two 2 mm-thick soundproof walls 25 are disposed in parallel as shown in FIG. 4B, it is possible to obtain a 20 dB-reduction soundproof effect (10 dB+10 dB). When a plurality of soundproof walls 25 are disposed thus, it is possible to obtain a soundproof effect as the sum of the soundproof effects corresponding to the number of the soundproof walls 25. In addition, when a 4 mm-thick soundproof wall 25 which is twice thick is provided as shown in FIG. 4C, it is possible to obtain a 16 dB-reduction soundproof effect (10 dB+20 $\log_{10} 2$ dB). When the thickness of the soundproof wall 25 is increased in this manner, it is possible to enhance the soundproof effect.

Next, a modification of the grommet according to the embodiment will be described.

Incidentally, constituent parts the same as those of the aforementioned grommet 10 are referred to by the same signs correspondingly and respectively, and description thereof will be omitted.

Figure 5:
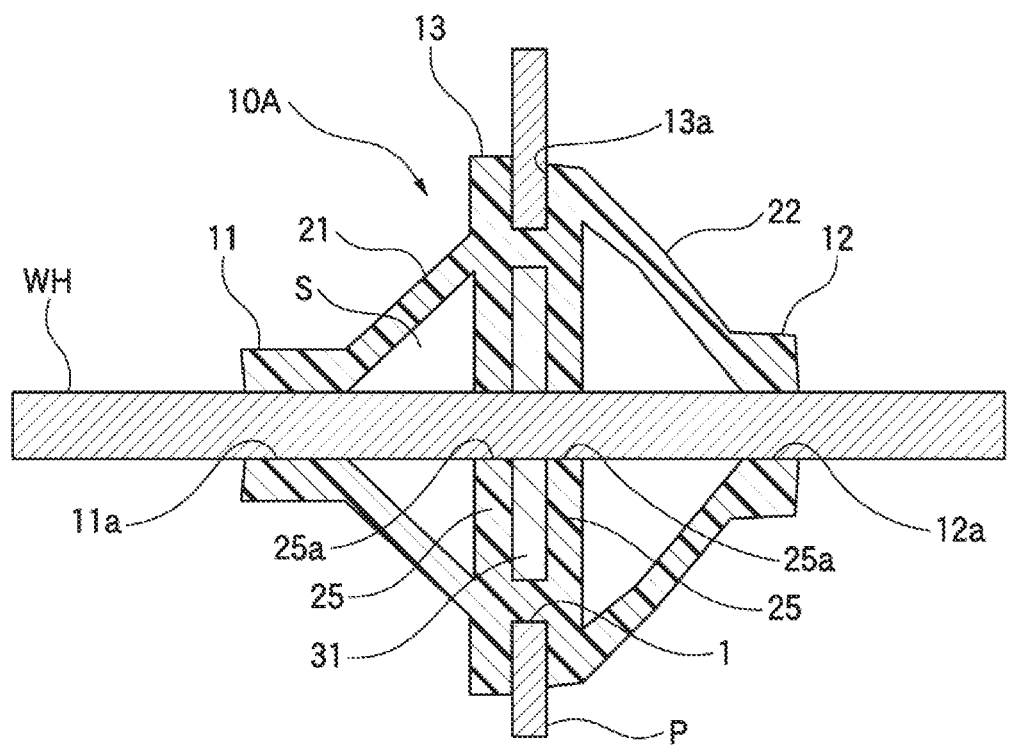
FIG. 5 is a sectional view of a grommet according to a modification.

FIG. 5 is a sectional view of a grommet according to the modification.

As shown in FIG. 5, for example, the grommet 10A according to the modification has a sound absorbing material 31 such as glass wool or urethane foam between soundproof walls 25. According to the grommet 10A in which the sound absorbing material 31 is provided between the soundproof walls 25, it is possible to absorb transmitted sound by the soundproof walls 25 and the sound absorbing material 31 so that it is possible to obtain a further higher soundproof effect.

Next, a method for manufacturing the grommet 10 (10A) according to the aforementioned embodiment will be described.

A melted material is injected into a cavity inside molds and the molds are released after the material is solidified. Thus, the grommet 10 is obtained as a molded article. As the molds, an external mold for molding the shape of an outer circumferential surface of the grommet 10 and an internal mold for molding the shape of an inner circumferential surface of the grommet 10 are used.

Figure 6:
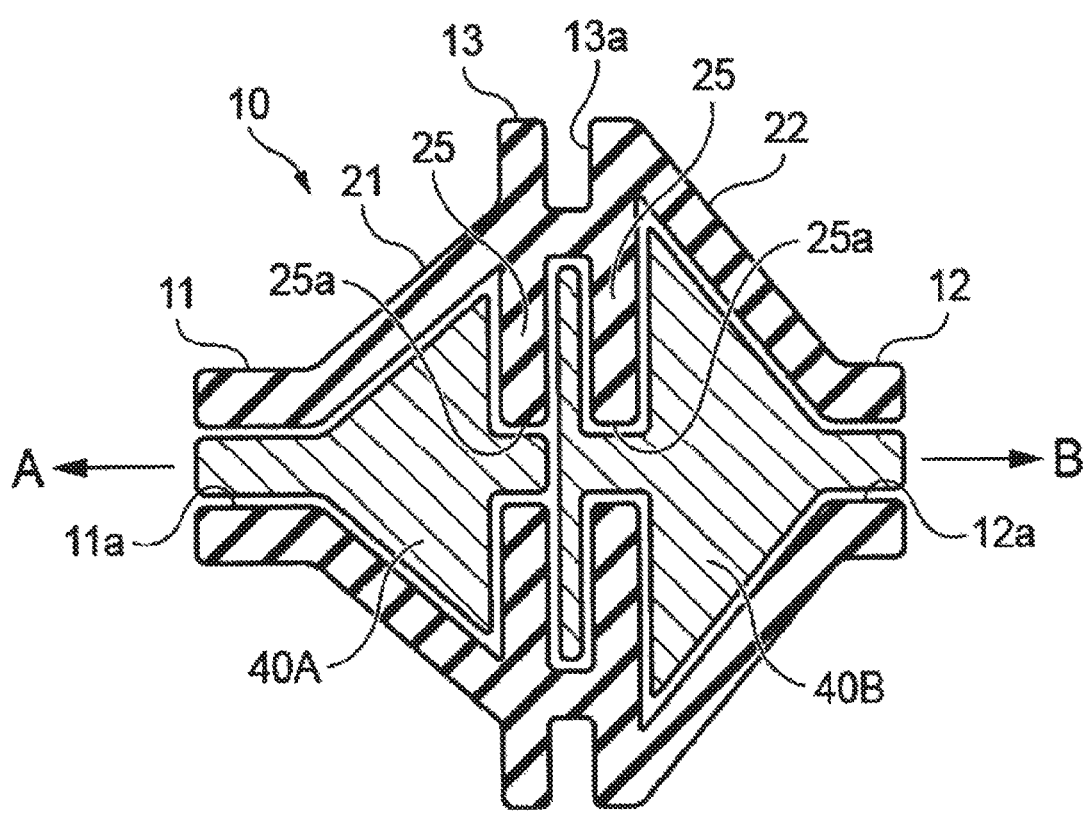
FIG. 6 is a sectional view for explaining an internal mold for molding the grommet in FIG. 1.

FIG. 6 shows the relation between the grommet 10 and internal mold parts 40A and 40B.

As shown in FIG. 6, in the method for manufacturing the grommet 10 according to the embodiment, the internal mold for molding the internal shape of the grommet 10 is divided axially into two parts with the soundproof walls 25 as a boundary. After the grommet 10 is molded, one internal mold part 40A of the divided two internal mold parts is removed toward one axial side (in a direction of an arrow A) relatively to the molded grommet 10. In addition, the other internal mold part 40B of the divided two internal mold parts is removed toward the other axial side (in a direction of an arrow B) relatively to the molded grommet 10. In the aforementioned manner, it is possible to obtain the grommet 10 as a molded article.

When manufacturing is performed thus, it is possible to relatively remove the divided internal mold parts 40A and 40B from the grommet 10. Accordingly, it is possible to easily mold the grommet 10 having an integral structure including the soundproof walls 25.

Figure 7:
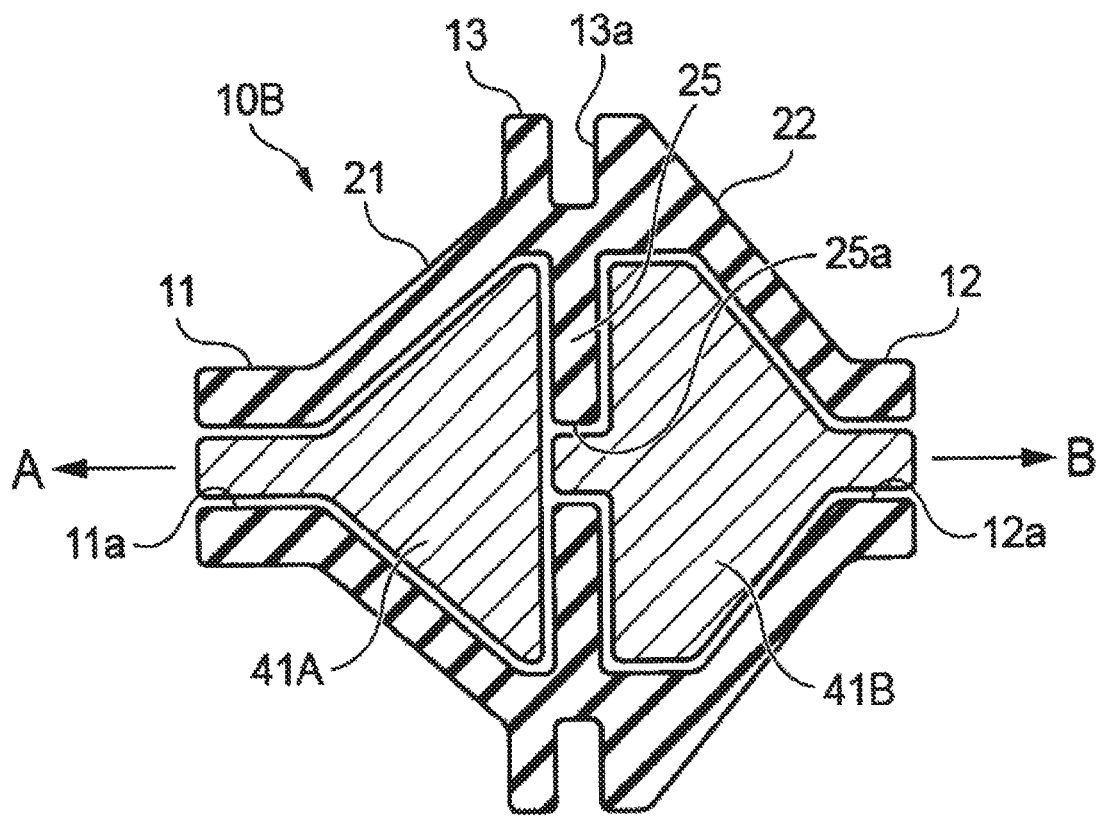
FIG. 7 is a sectional view for explaining an internal mold for molding a grommet according to another modification.

The case of the example shown in FIG. 6 is a case where two soundproof walls 25 are provided. Accordingly, the mold can be released when the hole of one of the soundproof walls 25 is expanded. However, when one soundproof wall 25 is provided alternatively as shown in FIG. 7, internal mold parts 41A and 41B can be removed more easily in directions of arrows A and B.

Incidentally, when air is blown into a space between the grommet 10 and each internal mold part 40A, 40B, 41A, 41B to expand the grommet 10 during mold release of the internal mold part, the internal mold part 40A, 40B, 41A, 41B can be removed from the grommet 10 more easily.

Next, a grommet according to another embodiment of the invention and a method for manufacturing the grommet will be described.

Second Embodiment

Figure 8:
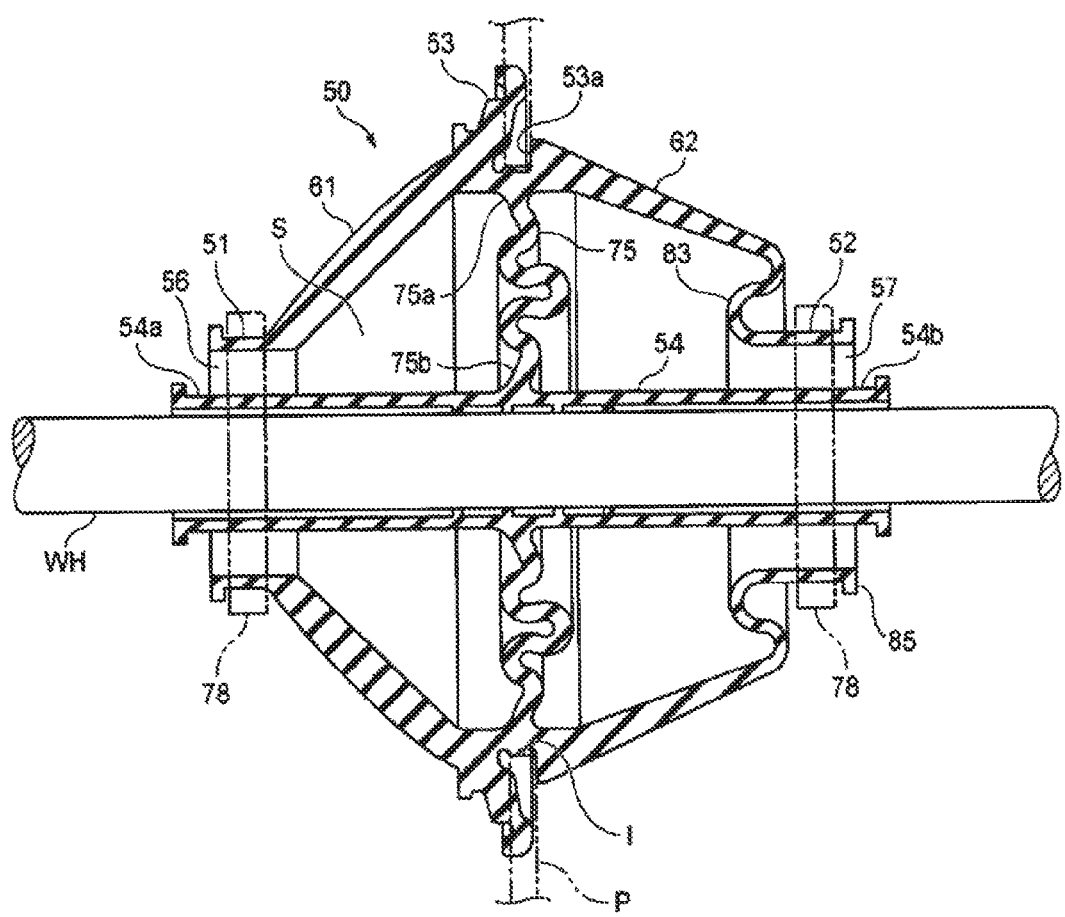
FIG. 8 is a sectional view of a grommet according to a second embodiment.
Figure 9:
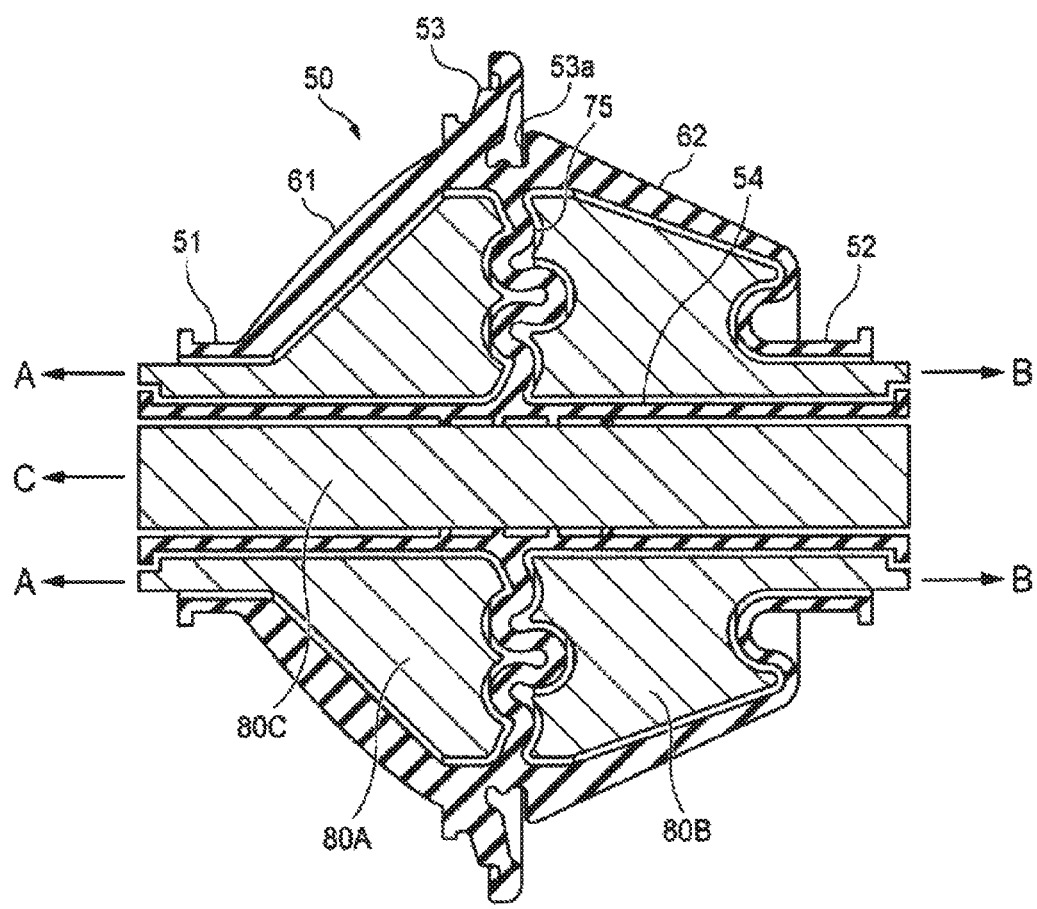
FIG. 9 is a sectional view for explaining an internal mold for molding the grommet in FIG. 8.

FIG. 8 is a sectional view showing the configuration of a grommet according to a second embodiment of the invention. FIG. 9 is a sectional view for explaining an internal mold for molding the grommet.

As shown in FIG. 8, the grommet 50 is made of an elastic material such as rubber or elastomer and mounted in an opening portion 1 of a panel P. The grommet 50 has a pair of annular circumferential walls (partition walls) 61 and 62, an annular panel fixation portion 53, and a circular cylinder-shaped long cylinder portion 54. The circumferential walls 61 and 62 form a sound insulation space S around a wire harness WH. The panel fixation portion 53 is positioned in an axially intermediate portion of the grommet 50. The long cylinder portion 54 is disposed on an inner circumferential side of the circumferential walls 61 and 62 and mounted on an outer circumference of the wire harness WH.

The panel fixation portion 53 has an engagement groove 53*a* extending circumferentially. When an edge portion of the opening portion 1 of the panel P is engaged with the engagement groove 53*a*, the grommet 50 is mounted in the panel P. The pair of circumferential walls 61 and 62 are provided continuously to axially opposite sides of the panel fixation portion 53 mounted in the opening portion 1 of the panel P. Each of the circumferential walls 61 and 62 is formed into a conical shape (tapered cylinder shape) having a diameter which is gradually smaller as its distance from the panel fixation portion 53 is larger. Circular cylinder portions 51 and 52 concentric to the long cylinder portion 54 are provided at inner circumferential ends of the conical circumferential walls 61 and 62 which are separated at maximum distances from the panel fixation portion 53. These circular cylinder portions 51 and 52 are disposed adjacently to an outer circumference of the long cylinder portion 54 in a non-contact state through annular gaps 56 and 57. Thus, a sound insulation space S is defined between the long cylinder portion 54 and the cylindrical walls 61 and 62.

In addition, the grommet 50 has a soundproof wall 75 which is formed as an annular corrugated wall inside the sound insulation space S. The soundproof wall 75 is disposed on an inner circumferential side of the panel fixation portion 53 so as to intersect with a longitudinal direction of the wire harness WH. An outer circumferential end 75*a* of the soundproof wall 75 is connected to the inner circumference of the panel fixation portion 53. In addition, an inner circumferential end 75*b* of the soundproof wall 75 is connected to the outer circumference of the long cylinder portion 54. Thus, the sound insulation space S surrounded by the circumferential walls 61 and 62 is axially divided into two sound insulation space sections S1 and S2 by the soundproof wall 75.

Here, the annular corrugated wall forming the soundproof wall 75 is formed as an annular wall plate molded into a concentric corrugated shape. Incidentally, a bellows shape may be also included in the corrugated shape.

When the aforementioned grommet 50 is fitted in the opening portion 1 of the panel P to thereby bring the edge portion of the opening portion 1 into engagement with the engagement groove 53*a* of the panel fixation portion 53, the grommet 50 is mounted in the panel P. Thus, the wire harness WH is supported in the panel P by the grommet 50.

When the grommet 50 is fitted in the opening portion 1 of the panel P in this manner, the opening portion 1 is blocked with the grommet 50.

The grommet 50 has the sound insulation space S surrounded by the circumferential walls 61 and 62. Further, the grommet 50 has the soundproof wall 75 inside the sound insulation space S. Accordingly, sound of an engine room can be reduced by the two circumferential walls 61 and 62 which are multiple sound insulation walls and the one soundproof wall 75, and reduced by the sound insulation space S. Thus, the sound of the engine room can be suppressed from being transmitted to a cabin of a vehicle through the opening portion 1.

Particularly, the soundproof wall 75 is formed as an annular corrugated wall. Accordingly, incident sound striking against the corrugated wall is reflected and diffused. Consequently, waves of the incident sound and waves of the reflected sound cancel each other actively. Thus, sound insulation properties are enhanced. In addition, the soundproof wall 75 is disposed in a panel fitting position in the center of the grommet 50 through which transmitted sound always passes. Accordingly, soundproof performance can be exerted surely. Thus, it is possible to obtain a high sound reduction effect by the soundproof wall 75 even without particularly increasing the thickness of the soundproof wall 75.

In addition, in the grommet 50, the circular cylinder portions 51 and 52 provided at the inner circumferential ends of the pair of circumferential walls are disposed adjacently to the outer circumference of the long cylinder portion 54 in a non-contact state. The long cylinder portion 54 is mounted on the outer circumference of the wire harness. Accordingly, intrusion of external sound into the sound insulation space S can be reduced to the minimum so that sound insulation properties can be increased. In addition, when the circular cylinder portions 51 and 52 are clamped together with the long cylinder portion 54 by tie bands or tapes etc. 78 after the wire harness WH is passed through the long cylinder portion 54, intrusion of sound from the annular gaps 56 and 57 between the circular cylinder portions 51 and 52 and the long cylinder portion 54 can be blocked. Accordingly, soundproof properties can be improved more greatly. In this case, a band slip-off preventing portion 85 for preventing the tie band or tape etc. 78 from slipping off is preferably provided erectly integrally with the circular cylinder portion 52 at an axial terminal portion of the circular cylinder portion 52, i.e. in a position separated at a maximum distance from the panel fixation portion 53.

In addition, the outer circumferential end 75a and the inner circumferential end 75b of the soundproof wall 75 disposed inside the sound insulation space S are connected to the inner circumference of the panel fixation portion 53 and the outer circumference of the long cylinder portion 54 respectively. Accordingly, the sound insulation space S can be divided into two sections airtightly. Consequently, leakage of transmitted sound between the divided two sound insulation space sections S1 and S2 can be prevented surely so that the soundproof effect by the soundproof wall 75 can be further enhanced.

From the above results, it is possible to enhance the soundproof effect greatly without increasing the size and it is also possible to suppress material cost, in comparison with a grommet in which a sound insulation space S is enlarged or the thickness of each of circumferential walls 61 and 62 is increased in order to enhance a soundproof effect. In addition, it is also possible to prevent mounting work from being complicated due to an increase in the thickness of each of the circumferential walls 61 and 62.

Incidentally, also in the aforementioned grommet 50, the sound insulation space S can be filled with a sound absorbing material. Thus, transmitted sound can be further absorbed so that a higher soundproof effect can be obtained.

In addition, in the grommet 50 shown in FIG. 8, a curved portion 83 which is curved into an S-shape is provided continuously to the panel fixation portion 53 side of the circular cylinder portion 52 in the circumferential wall 62 in order to relax assembling stress for fitting the grommet 50 to the panel P. It is a matter of course that the curved portion 83 may be used in a grommet having another configuration such as the aforementioned grommet 10 or 10A. Also in any of these cases, the assembling stress can be relaxed.

Next, a method for manufacturing the aforementioned grommet 50 will be described.

A melted material is injected into a cavity inside molds and the molds are released after the material is solidified. Thus, the grommet 50 is obtained as a molded article. As the molds, an external mold for molding the shape of an outer circumferential surface of the grommet 50 and an internal mold for molding the shape of an inner circumferential surface of the grommet 50 are used.

FIG. 9 shows the relation between the grommet 50 and internal mold parts 80A, 80B and 80C.

As shown in FIG. 9, three internal mold parts for molding the internal shape of the grommet 50 are used in the method for manufacturing the grommet 50 according to the embodiment. That is, the internal mold for forming the sound insulation space S (see FIG. 8) is axially divided into two parts with the soundproof wall 75 as a boundary. Accordingly, the first internal mold part 80A on one axial side and the second internal mold part 80B on the other axial side are used. Further, the third internal mold part 80C for molding the inner circumference of the long cylinder portion 54 is used.

After the grommet 50 is molded by use of such three first to third internal mold parts 80A to 80C, the first internal mold part 80A of the two divided internal mold parts is removed toward one axial side (in a direction of an arrow A) relatively to the molded grommet 50. In addition, the second internal mold part 80B of the two divided internal mold parts is removed toward the other axial side (in a direction of an arrow B) relatively to the molded grommet 50. In addition, the third internal mold part 80C is removed toward one side (in a direction of an arrow C) or the other side. In the aforementioned manner, the grommet 50 can be obtained as a molded article.

When the grommet 50 is manufactured thus, the molded soundproof wall 75 is not an obstacle, but the divided internal mold parts 80A and 80B can be relatively removed from the grommet 50. Accordingly, the grommet 50 having an integral structure including the soundproof wall 75 can be molded easily.

Also in the case, when air is blown into a space between the grommet 50 and each internal mold part 80A, 80B to expand the grommet 50 during mold release of the internal mold parts 80A to 80C, the internal mold part 80A, 80B can be extracted from the grommet 50 more easily.

In the case of a grommet (common to each of the grommets in the embodiments) containing a sound insulation space (also called air layer or air chamber) as described above, sound waves may cancel each other or on the contrary resonate with each other to cause resonance amplification of sound due to the influence of reflection of sound inside the sound insulation space. As a result, some sounds have a frequency to be attenuated easily in the grommet, and other sounds have a frequency to be transmitted easily in the grommet.

For example, consider a condition causing resonance amplification of sound in an air column model.

Figure 10A:
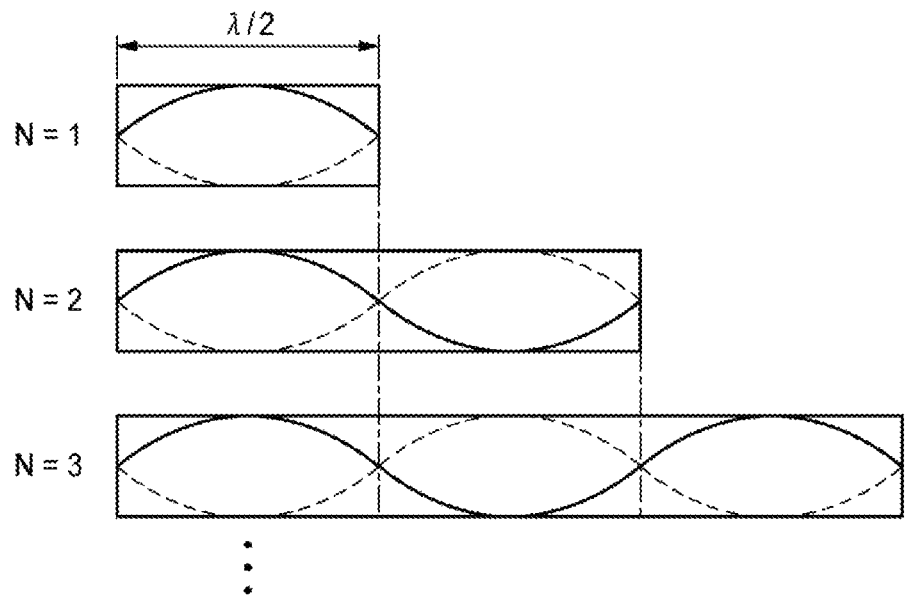
Figure 10B:
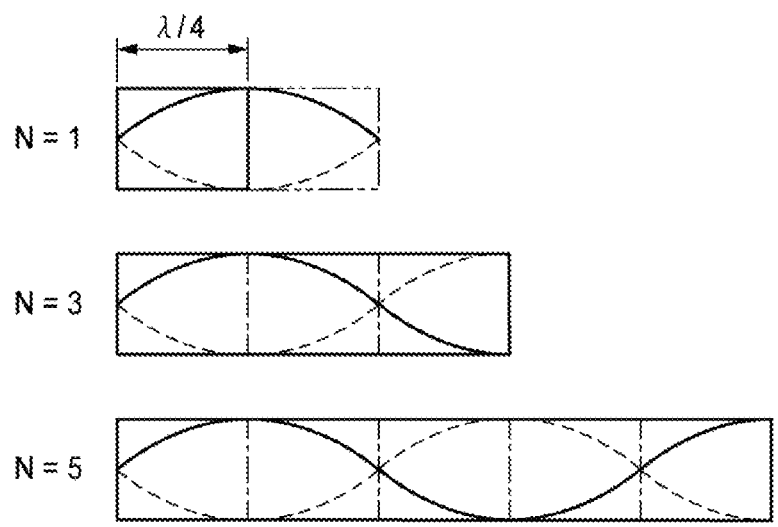

FIGS. 10A and 10B are views explaining principles in the case where an axial length of a sound insulation space is set. FIG. 10A is a view showing a condition when the sound insulation space (an air column is a model) serves as a resonance amplification function on sound having a wavelength λ. FIG. 10B is a view showing a condition when the sound insulation space (the air column is the model) serves as a cancellation function on the sound having the wavelength λ.

In the case of the model of a both-end closed type air column, assume that a length L of the air column relative to the sound having the wavelength λ is equal to λ/2, as shown in FIG. 10A. In this case, a standing wave having nodes at its both ends is generated. Thus, resonance amplification occurs in this condition. In addition, the same thing occurs when L=(λ/2)·N (wherein N=1, 2, 3 . . . ).

On the other hand, consider a reverse condition to the case of resonance amplification. When the length L of the air column relative to the sound having the wavelength λ is equal to λ/4, as shown in FIG. 10B, a cancellation effect occurs due to reflected sound. Also in the case, the same thing occurs when L=(λ/4)·N (wherein N=1, 3, 5, . . . ).

The aforementioned two conditions can be expressed by separate expressions as follows.

$$\text{Resonance Amplification Condition: } f=(cN)/(2L) \quad (1)$$

$$\text{Cancellation Condition: } f=(cN)/(4L) \quad (2)$$

wherein f: frequency (Hz)
L: axial length (m) of sound insulation space
c: sound speed (m/sec)=about 340 m/s
λ: wavelength (m)
N in Expression (1) is 1, 2, 3, . . . .
N in Expression (2) is 1, 3, 5, . . . .

According to the principles described based on the aforementioned air column model, it is desirable that all cancellation frequencies of the sound insulation space S divided into a plurality of sections (S1, S2) by the soundproof wall are included in a target frequency band to be attenuated in the grommet according to each of the aforementioned embodiments.

For example, assume that, of frequencies of sound to be transmitted from the outside of a cabin into the cabin, a frequency band (target frequency band) of sound whose transmission should be suppressed is 2,000 to 6,000 Hz. In this case, an axial length of each sound insulation space section is set as the length L obtained based on the aforementioned Expression (2) in which 2,000 to 6,000 is applied as f, transmission of the sound in the target frequency band can be suppressed effectively.

On that occasion, it may be set to prevent resonance amplification conditions from overlapping among the plurality of sound insulation space sections. Specifically, when the axial lengths of the sound insulation space sections are arranged to be different from each other, the conditions are set to make the cancellation frequencies of the sound insulation space sections different from one another. For example, the cancellation frequency of the large sound insulation space section is set at 3,000 Hz and the cancellation frequency of the small sound insulation space section is set at 5,000 Hz.

Particularly, when a ratio between the length of the large sound insulation space section and the length of the small sound insulation space section is set at 2:1, sound amplified due to resonance by one sound insulation space section can be cancelled by the other sound insulation space section. Accordingly, a wide range can be covered.

Figure 11:
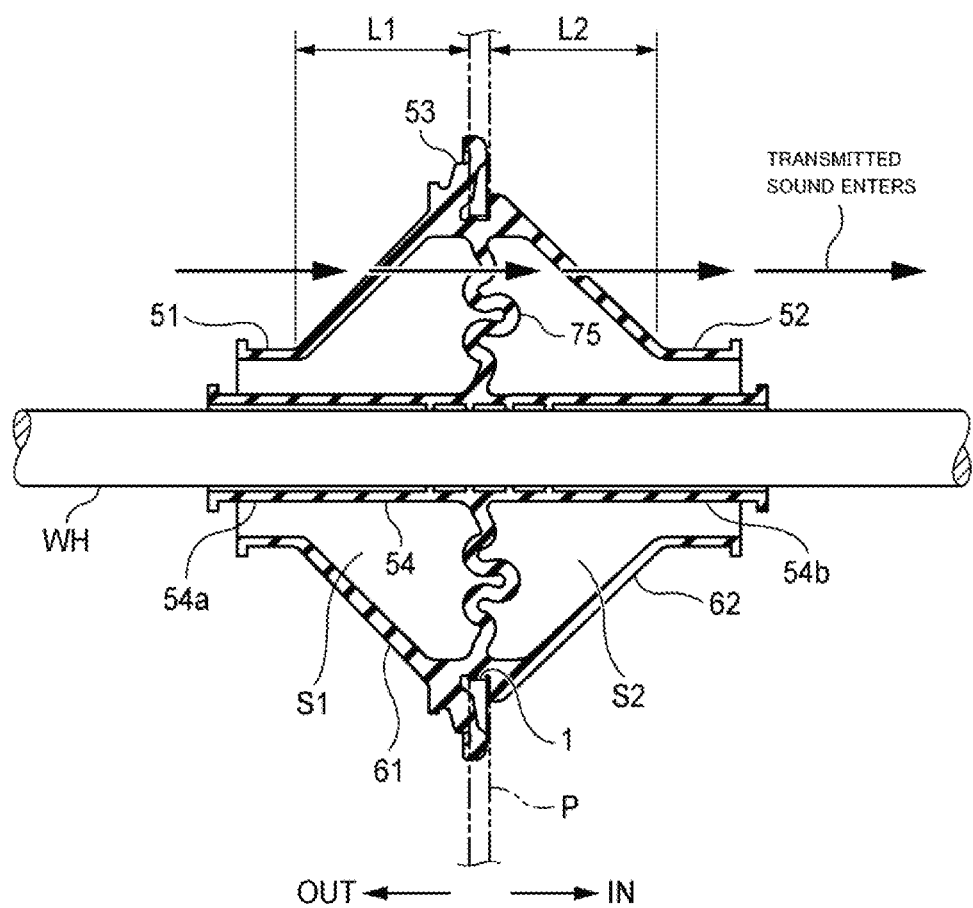
FIG. 11 is a view for explaining an example for setting specific dimensions of the grommet according to the embodiment in FIG. 8.

FIG. 11 is an explanatory view of an example for setting specific dimensions of the grommet according to the embodiment shown in FIG. 8.

The circular cylinder portions 51 and 52 located at the opposite ends are clamped together with the long cylinder portion 54 by the tie bands or tapes 78 (see FIG. 8) after the wire harness WH is passed through the long cylinder portion 54. In this manner, the annular gaps 56 and 57 between the circular cylinder portions 51 and 52 and the long cylinder portion 54 are closed.

Assume that the axial length of the sound insulation space section S1 on one side (e.g. the engine room) OUT of the panel P from which sound enters is L1, and the length of the sound insulation space section S2 on the other side (e.g. the cabin side) IN of the panel P is L2. In this case, L1 and L2 are calculated and set in accordance with the aforementioned Expression (2) based on the target frequency f. On this occasion, L1:L2 may be set at 2:1. In a case where, for example, L1 is set at 40 mm, L2 is 20 mm.

Practically, L1 and L2 may be optimized based on experiments in consideration of the aforementioned resonance and cancellation principles.

Next, a preferable material of the grommet for enhancing soundproof properties more greatly will be described. Although the grommet 10 will be described here by way of example, the same rule may also apply to the grommet 10A or 50.

It has been known that soundproof performance of a wall body made of a fine and uniform material can be expressed by the following Expression (3).

$$TLo=20 \log(f \times M)-42.5 \text{ (dB)} \quad (3)$$

wherein: TLo means transmission loss (dB); f, frequency (Hz); and M, material density (kg/m³).

As described above, rubber is generally used for the grommet 10. As obvious from the Expression (3), the material density M can be enhanced to increase the transmission loss of the sound and therefore enhance soundproof properties. Accordingly, an inorganic substance such as a calcium carbonate-based material is mixed into rubber or elastomer as the material of the grommet 10 to thereby increase the density. Alternatively, a high density material such as polysulfide rubber or fluororubber may be used. Preferably, the material density is not smaller than 1,100 kg/m³.

In addition, even when hardness of the material is enhanced, vibration of the grommet 10 can be suppressed so that the soundproof properties can be enhanced. Preferably, the hardness is set to be 45 or higher.

Incidentally, the invention is not limited to the aforementioned embodiments but modification, improvement, etc. can be made thereon suitably. In addition, as long as the invention can be achieved, the materials, shapes, dimensions, numbers, arrangement places, etc. of the respective constituent members in the aforementioned embodiments are not limited but can be changed desirably.

For example, each of the aforementioned embodiments has been described in the case where the grommet 10, 10A, 50 is mounted in the panel P consisting of a dash panel by way of example. However, the panel P for mounting the grommet 10, 10A, 50 is not limited to the dash panel. When, for example, the grommet 10, 10A, 50 is mounted in a rear panel provided in a rear portion of a vehicle or in a door panel provided in a door of the vehicle, noise can be suppressed from being transmitted to a cabin of the vehicle through the rear or the door of the vehicle.

Third Embodiment

Figure 13A:
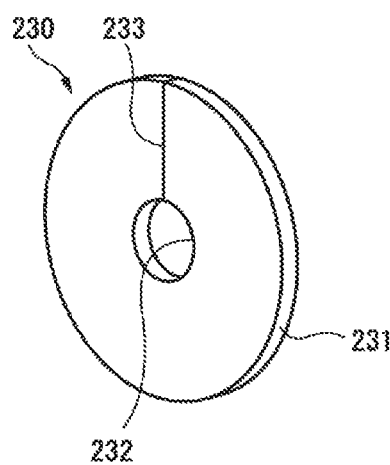
FIGS. 13A to 13C are configuration views of a sound insulation plate according to the third embodiment, FIG. 13A being a perspective view showing a state of the sound insulation plate which has not been attached to a cable, FIG. 13B being a perspective view showing a state of the sound insulation plate which is being attached to the cable, FIG. 13C being a perspective view showing a state of the sound insulation plate which has been attached to the cable.
Figure 13B:
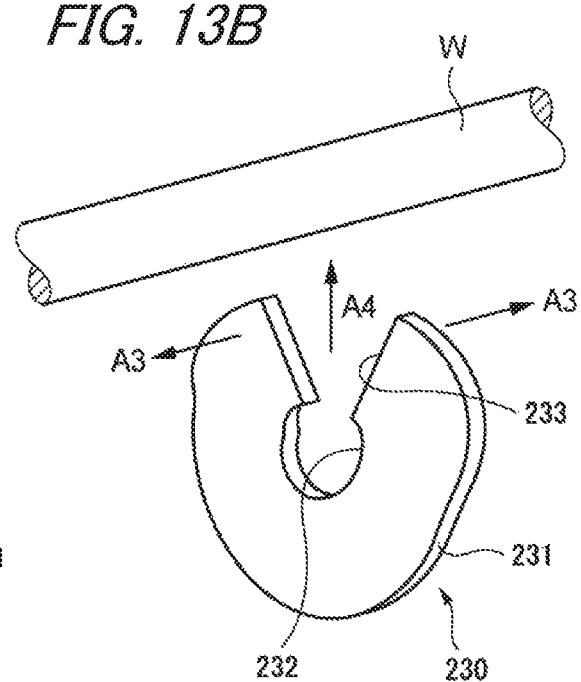
Figure 13C:
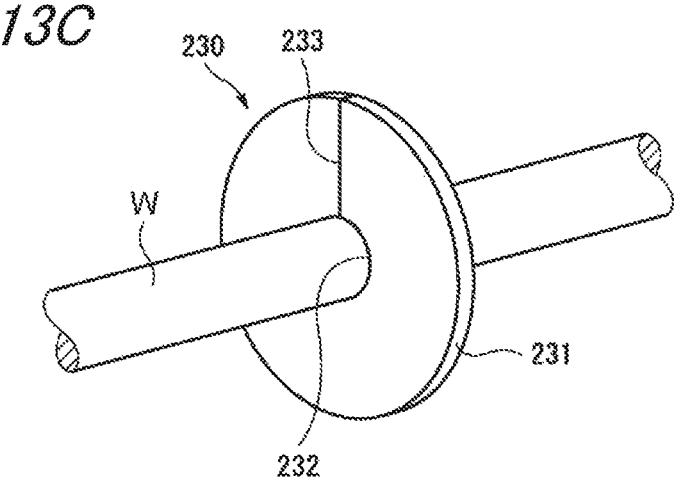

FIGS. 12A and 12B are configuration views of a grommet according to a third embodiment. FIG. 12A is a sectional view showing a state of the grommet which has not been attached, and FIG. 12B is a sectional view showing a state of the grommet which has been attached. FIGS. 13A to 13C are configuration views of a sound insulation plate. FIG. 13A is a perspective view showing a state of the sound insulation plate which has not been attached to a cable, FIG. 13B is a perspective view showing a state of the sound insulation plate which is being attached to the cable, and FIG. 13C is a perspective view showing a state of the sound insulation plate which has been attached to the cable.

As shown in FIGS. 12A and 12B, the grommet 201 is attached between a cable (wire harness) W and a through hole Pa of a vehicle body panel P. The cable W is passed through the through hole Pa provided in the panel P which partitions the inside and outside of a cabin of a car. The grommet 201 includes a grommet body 210 and a sound insulation plate 230. The grommet body 210 is molded integrally out of an elastic material such as rubber or elastomer. The sound insulation plate 230 is formed separately from the grommet body 210.

The grommet body 210 made of the elastic material has a thick large diameter cylinder portion 211, two small diameter cylinder portions 213 and 214, and two tapered cylinder-shaped thin coupling shield walls 215 and 216. The large diameter cylinder portion 211 has an annular panel engagement portion 212 in its outer circumference so that the annular panel engagement portion 212 can be engaged with an inner circumferential edge of the through hole Pa of the panel P. The two small diameter cylinder portions 213 and 214 are disposed on axially opposite sides of the large diameter cylinder portion 211 and tightly fitted to an outer circumference of the cable W passed through the through hole Pa. Outer circumferential edges of the coupling shield walls 215 and 216 are connected to the large diameter cylinder portion 211, and inner circumferential edges of the coupling shield walls 215 and 216 are connected to the small diameter cylinder portions 213 and 214. Accordingly, annular spaces between the large diameter cylinder portion 211 and the small diameter cylinder portions 213 and 214 can be shielded by the coupling shield walls 215 and 216 respectively. An annular fitting groove 220 is formed in an inner circumference of the large diameter cylinder portion 211 so that the fitting groove 220 can be located on an inner circumferential side of the panel engagement portion 212 located on the outer circumferential side, and an outer circumferential edge 231 of the sound insulation plate 230 can be fitted into the fitting groove 220.

The sound insulation plate 230 is formed as an annular circular plate which can partition the inside of the grommet body 210 into two hermetically sealed spaces S1 and S2 when the outer circumferential edge 231 of the sound insulation plate 230 which has been tightly fitted to the outer circumference of the cable W is fitted into the annular fitting groove 220 of the grommet body 210. As shown in FIGS. 13A to 13C, a slit 233 extending from the outer circumferential edge 231 to an inner circumferential edge 232 is provided in one circumferential portion of the annular sound insulation plate 230 so that the slit 233 can be opened and closed in order to make it easy to mount the sound insulation plate 230 on the electric wire W.

A metal plate (e.g. an iron plate, a lead plate, etc.) high in sound insulation properties, a laminate plate made of metal or any other material than metal, a honeycomb structure plate, a resin plate, a hard rubber plate, etc. can be used as the material of the sound insulation plate 230. In addition, the thickness, the size of an outer diameter, etc. of the sound insulation plate 230 may be selected desirably in consideration of requested sound insulation performance, the size of the grommet body 210, etc. In addition, a rib may be provided in a plate face of the sound insulation plate 230 to increase rigidity of the sound insulation plate 230 so as to prevent the sound insulation plate 230 from easily vibrating.

Assume that the grommet body 210 is used. In this case, first, opposite side portions of the slit 233 of the sound insulation plate 230 are, for example, pulled toward axially opposite sides to each other as designated by arrows A3 as shown in FIG. 13B. Thus, the slit 233 is opened. The cable W is inserted into the opened slit 233 as designated by an arrow A4. Thus, the sound insulation plate 230 is fitted to the outer circumference of the cable W, as shown in FIG. 13C.

Next, the cable W is inserted into the grommet body 210, as designated by an arrow A1 in FIG. 12A. In addition, in a state in which one small diameter cylinder portion 214 has been expanded in diameter, the sound insulation plate 230 mounted on the outer circumference of the cable W is inserted into the grommet body 210 through the thus expanded small diameter cylinder portion 214. Next, the outer circumferential edge 231 of the sound insulation plate 230 which has been inserted into the grommet body 210 is fitted into the annular fitting groove 220 in the inner circumference of the large diameter cylinder portion 211 of the grommet body 210. Next, the small diameter cylinder portions 213 and 214 at the opposite ends of the grommet body 210 and the cable W are fixed to each other by tapes or bands etc. In this manner, the sound insulation plate 230 can be prevented from being displaced easily. In addition, the two hermetically sealed spaces S1 and S2 partitioned by the sound insulation plate 230 are secured inside the grommet body 210.

Then, the grommet body 210 is inserted into the through hole Pa of the panel P, as designated by an arrow A2, so that the panel engagement portion 212 in the outer circumference of the large diameter cylinder portion 211 of the grommet body 210 can be brought into engagement with the inner circumferential edge of the through hole Pa of the panel P. In the aforementioned manner, assembling is completed.

In the grommet 201 having the aforementioned configuration, the sound insulation plate 230 is disposed inside the grommet body 210. In this manner, the inside of the grommet body 210 can be partitioned into the two hermetically sealed spaces S1 and S2. Accordingly, it is possible to reduce transmitted sound D which is transmitted through the grommet 201 to intend to enter the cabin. As a result, it is possible to enhance sound insulation performance of the grommet 201.

In addition, since the sound insulation plate 230 is formed separately from the grommet body 210, a sound insulation collar portion (sound insulation wall) as in the background-art does not have to be molded integrally with the grommet body 210. Thus, molding can be performed easily and mold removal (mold release) during molding of the grommet body 210 can be made easy.

In addition, the sound insulation plate 230 is separate from the grommet body 210. Accordingly, the sound insulation plate 230 can be formed to be able to exert sufficient sound insulation properties. That is, the degree of freedom for designing the sound insulation plate 230 is large. Accordingly, the sound insulation plate 230 can be made to exert sound insulation performance in conformity with a request.

In addition, the sound insulation plate 230 is configured to be fitted into the fitting groove 220 of the grommet body 210. Accordingly, it is possible to position and fix the sound insulation plate 230 surely. Therefore, there is no fear that the sound insulation plate 230 may be displaced or detached when, for example, the grommet 201 is attached. Accordingly, it is possible to exert high sound insulation performance which is always stable.

In addition, in the grommet 201, the slit 233 is provided in the sound insulation plate 230. Accordingly, it is possible to fit the sound insulation plate 230 onto the outer circumference of the cable W easily while opening the slit 233. Thus, it is possible to improve assembling efficiency.

In addition, in the grommet 201, the fitting groove 220 for the sound insulation plate 230 is provided in an inner circumferential side position corresponding to the panel engagement portion 212 provided in the outer circumference of the large diameter cylinder portion 211. Accordingly, it is possible to dispose the sound insulation plate 230 in the position of the panel P. Accordingly, almost the whole of an opening region of the through hole Pa of the panel P can be blocked with the sound insulation plate 230 so that soundproof performance can be improved more greatly.

In addition, as described above, the sound insulation plate 230 is attached to the grommet body 210 in a state in which the sound insulation plate 230 has been attached to the outer circumference of the cable W in advance, and the grommet body 210 is then attached to the through hole Pa of the panel P. In this case, assembling can be made easy.

Incidentally, the invention is not limited to the aforementioned embodiments but modification, improvement, etc. can be made thereon suitably. In addition, as long as the invention can be achieved, the materials, shapes, dimensions, numbers, arrangement places, etc. of the respective constituent members in the aforementioned embodiments are not limited but can be changed desirably.

For example, only one sound insulation plate 230 is provided in the aforementioned embodiment. However, a plurality of annular fitting grooves 220 may be provided so that a plurality of sound insulation plates can be provided accordingly.

In addition, when the two hermetically sealed spaces S1 and S2 partitioned by the sound insulation plate 230 are filled with a sound absorbing material in the aforementioned embodiment, sound insulation performance can be further enhanced.

Fourth Embodiment

Figure 14:
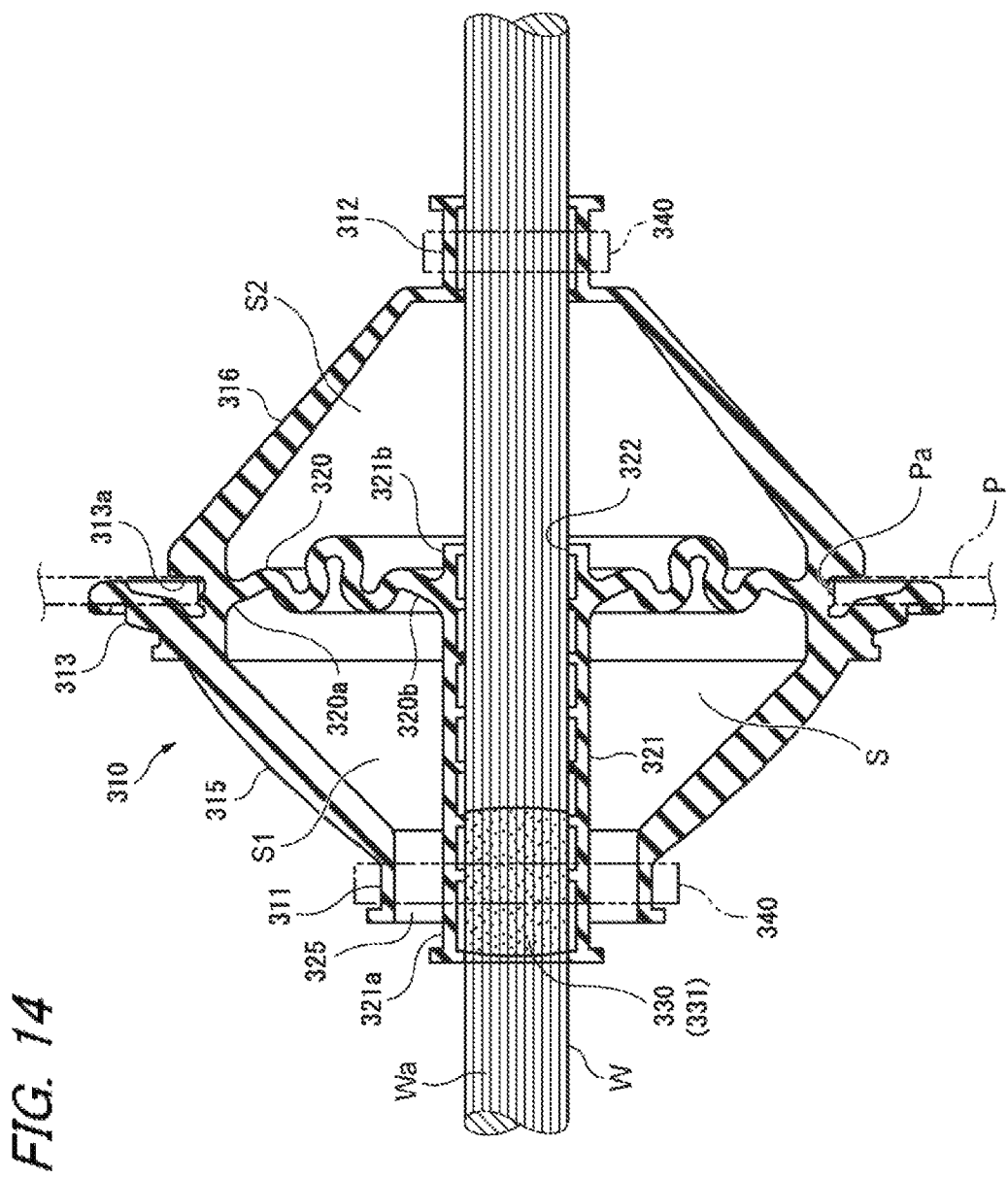
FIG. 14 is a sectional view of a grommet according to a fourth embodiment of the invention.

FIG. 14 is a sectional view of a grommet according to a fourth embodiment.

As shown in FIG. 14, the grommet 310 is formed integrally out of an elastic material such as rubber or elastomer. The grommet 310 is fixed to a wire harness W to be inserted through a through hole Pa of a panel P. The grommet 310 is then fitted into the through hole Pa and mounted in the panel P. In this manner, the grommet 310 supports the wire harness W in the panel P.

The grommet 310 has a large diameter cylinder portion 313, two tapered cylinder-shaped coupling shield walls 315 and 316, an inner cylinder portion 321, and a sound insulation wall 320. The large diameter cylinder portion 313 is fitted in the through hole Pa of the panel P. The coupling shield walls 315 and 316 extend from the large diameter cylinder portion 313 toward axially opposite sides. The inner cylinder portion 321 is disposed on an inner circumferential side of the coupling shield walls 315 and 316 and tightly fitted on an outer circumference of the wire harness W. The sound insulation wall 320 is provided on an inner circumference of the large diameter cylinder portion 313 to extend along a direction intersecting with the wire harness W.

The large diameter cylinder portion 313 includes an annular engagement groove 313a in its outer circumference. The annular engagement groove 313a serves as a panel fixation portion which can be fixed to a hole edge of the through hole Pa of the panel P. The two tapered cylinder-shaped coupling shield walls 315 and 316 have diameters which are gradually smaller as their distances from the large diameter cylinder portion 313 are larger. The coupling shield walls 315 and 316 have small diameter cylinder portions 311 and 312 respectively at their inner circumferential ends whose diameters are small thus. The small diameter cylinder portions 311 and 312 are portions which are disposed adjacently to or in tight contact with the outer circumference of the wire harness W. A sound insulation space S is formed around the wire harness W by the two tapered cylinder-shaped coupling shield walls 315 and 316.

The inner cylinder portion 321 has an end portion 321a on one axial side (a side of an environment outside the cabin, such as an engine room). The end portion 321a is inserted into the small diameter cylinder portion 311 at the inner circumferential end of the coupling shield wall 315 while keeping an annular gap 325 with respect to an inner side of the small diameter cylinder portion 311. Incidentally, the gap 325 may be closed by a tie band or tape 340 etc., as will be described later. The inner cylinder portion 321 in the embodiment extends continuously with a length corresponding to one half of an axial length between the opposite inner circumferential ends (the small diameter cylinder portions 311 and 312) of the two tapered cylinder-shaped coupling shield walls 315 and 316. An opening end 322 at an end portion 321b (which corresponds to the position of the panel P) on an opposite side to the end portion 321a which is inserted into the small diameter cylinder portion 311 at the inner circumferential end of the coupling shield wall 315 is open to the inside of the sound insulation space S.

In addition, the sound insulation wall 320 is disposed inside the sound insulation space S. An outer circumferential end 320a of the sound insulation wall 320 is coupled to the inner circumference of the large diameter cylinder portion 313. An inner circumferential end 320b of the sound insulation wall 320 is coupled to the inner cylinder portion 321. Thus, the sound insulation space S is divided axially into two sound insulation space sections S1 and S2. The sound insulation wall 320 is formed as an annular corrugated wall. The corrugated wall is an annular wall plate molded into a concentric corrugated shape. A bellows shape may be also included in the corrugated shape. Incidentally, it is most desirable that the sound insulation wall 320 is coupled to a position corresponding to the panel P in the inner circumference of the large diameter cylinder portion. However, the sound insulation wall 320 may be coupled to the inner circumference of one of the coupling shield walls 315 and 316 in a position close to the position corresponding to the panel P.

The grommet 310 is attached to the wire harness W as follows. That is, the wire harness W is passed through the inner cylinder portion 321 and one small diameter cylinder portion 312. Then, a tie band or tape 340 etc. is wound around the small diameter cylinder portion 312 to thereby fix the small diameter cylinder portion 312 to the wire harness W. In addition, a tie band or tape 340 etc. is wound around the other small diameter cylinder portion 311 positioned on the outer side of the inner cylinder portion 321 so that the other small diameter cylinder portion 311 can be fixed to the wire harness W from above the inner cylinder portion 321 by the tie band or tape 340. In this manner, the grommet 310 is fixed to the wire harness W.

Either after or before the wire harness W is attached to the grommet 310, a water sealant 331 made of silicon etc. is injected into gaps among electric wires Wa of the wire harness W to which the inner cylinder portion 321 is tightly fitted and into a gap between the electric wires Wa and the inner circumference of the inner cylinder portion 321, and the water sealant 331 is then solidified. In this manner, a water sealing portion 330 in which the gaps among the electric wires Wa are sealed is provided inside the inner cylinder portion 321. With the configuration made in this manner, the large diameter cylinder portion 313 of the grommet 310 is fitted into the through hole Pa of the panel P to bring the engagement groove 313a into engagement with the hole edge of the through hole Pa. Therefore, the grommet 310 is mounted in the panel P. Thus, the wire harness W can be supported in the panel P by the grommet. When the grommet 310 is fitted thus in the through hole Pa of the panel P, the through hole Pa is blocked with the grommet 310.

The grommet 310 has the sound insulation space S internally. The grommet 310 further has the sound insulation wall 320 inside the sound insulation space S. Accordingly, noise transmitted from the engine room on a left side of the panel P in FIG. 14 into the cabin on a right side of the panel P in FIG. 14 through the grommet 310 can be reduced by the two coupling shield walls 315 and 316, the sound insulation wall 320 and the sound insulation space S (S1, S2).

In this case, the sound insulation space (air layer) S having a large volume can be secured around the wire harness W. Accordingly, sound insulation properties can be enhanced. Particularly, the outer circumferential end 320a and the inner circumferential end 320b of the sound insulation wall 320 which is disposed inside the sound insulation space S are connected to the inner circumference of the large diameter cylinder portion 313 and the outer circumference of the inner cylinder portion 321 respectively. Accordingly, the sound insulation space S can be divided into two sections airtightly. Thus, it is possible to surely prevent transmitted sound from leaking between the divided sound insulation space sections S1 and S2 so that it is possible to further enhance a soundproof effect by the sound insulation wall 320.

In addition, the sound insulation wall 320 is formed as an annular corrugated wall. Accordingly, incident sound striking against the corrugated wall is reflected and diffused. Consequently, waves of the incident sound and waves of the reflected sound cancel each other actively. Thus, sound insulation properties are enhanced. In addition, the sound insulation wall 320 is disposed in a panel fitting position in the center of the grommet 310 through which the transmitted sound always passes. Accordingly, soundproof performance can be exerted surely. Consequently, it is possible to obtain a high sound reduction effect by the sound insulation wall 320 even without particularly increasing the thickness of the sound insulation wall 320.

Incidentally, in the grommet 310, the small diameter cylinder portion 311 at the inner circumferential end of the coupling shield wall 315 is clamped to the outer circumference of the inner cylinder portion 321 by the tie band or tape 340 etc. However, the small diameter cylinder portion 311 may be disposed adjacently to the inner cylinder portion 321 in a non-contact state. In this case, intrusion of external sound into the sound insulation space S can be reduced to the minimum. However, the small diameter cylinder portion 311 may be clamped together with the inner cylinder portion by the tie band or tape 340 etc. after the wire harness W is inserted into the inner cylinder portion 321 as in the illustrated example. In this manner, the annular gap 325 between the small diameter cylinder portion 311 and the inner cylinder portion 321 can be closed. Accordingly, it is possible to block intrusion of sound through the gap so that it is possible to improve soundproof properties more greatly.

Due to the water sealing portion 330 provided inside the inner cylinder portion 321, it is possible to prevent moisture from intruding from an environment (e.g. the engine room) on one side of the panel P into an environment (e.g. the cabin) on the other side of the panel P through the gaps among the electric wires Wa of the wire harness W. Moreover, it is also possible to prevent sound from intruding through the gaps among the electric wires Wa, and it is also possible to contribute to an improvement in sound insulation properties. In this case, the water sealing portion 330 can be disposed in any axial position of the inner cylinder portion 321 to obtain a water sealing effect. However, when the water sealing portion 330 is disposed in a position closer to a noise generation side (the engine room side) on the left side of the axially opposite sides of the panel P in FIG. 14 than the panel fixation portion of the large diameter cylinder portion 313, a high water sealing effect can be obtained by use of an optimal quantity of the water sealant 331.

In addition, according to the grommet 310 according to the embodiment, the inner cylinder portion 321 extends axially from the middle toward only one side. Accordingly, it is possible to improve insertion properties of the wire harness W when the grommet 310 is attached to the wire harness W.

Incidentally, due to a sound absorbing material filled in the sound insulation space S (S1, S2), it is possible to further absorb transmitted sound so that it is possible to obtain a higher soundproof effect.

Next, a method for manufacturing the aforementioned grommet 310 will be described.

A melted material is injected into a cavity inside molds and the molds are released after the material is solidified. Thus, the grommet 310 is obtained as a molded article. As the molds, an external mold for molding the shape of an outer circumferential surface of the grommet 310 and an internal mold for the shape of an inner circumferential surface of the grommet 310 are used.

Figure 15:
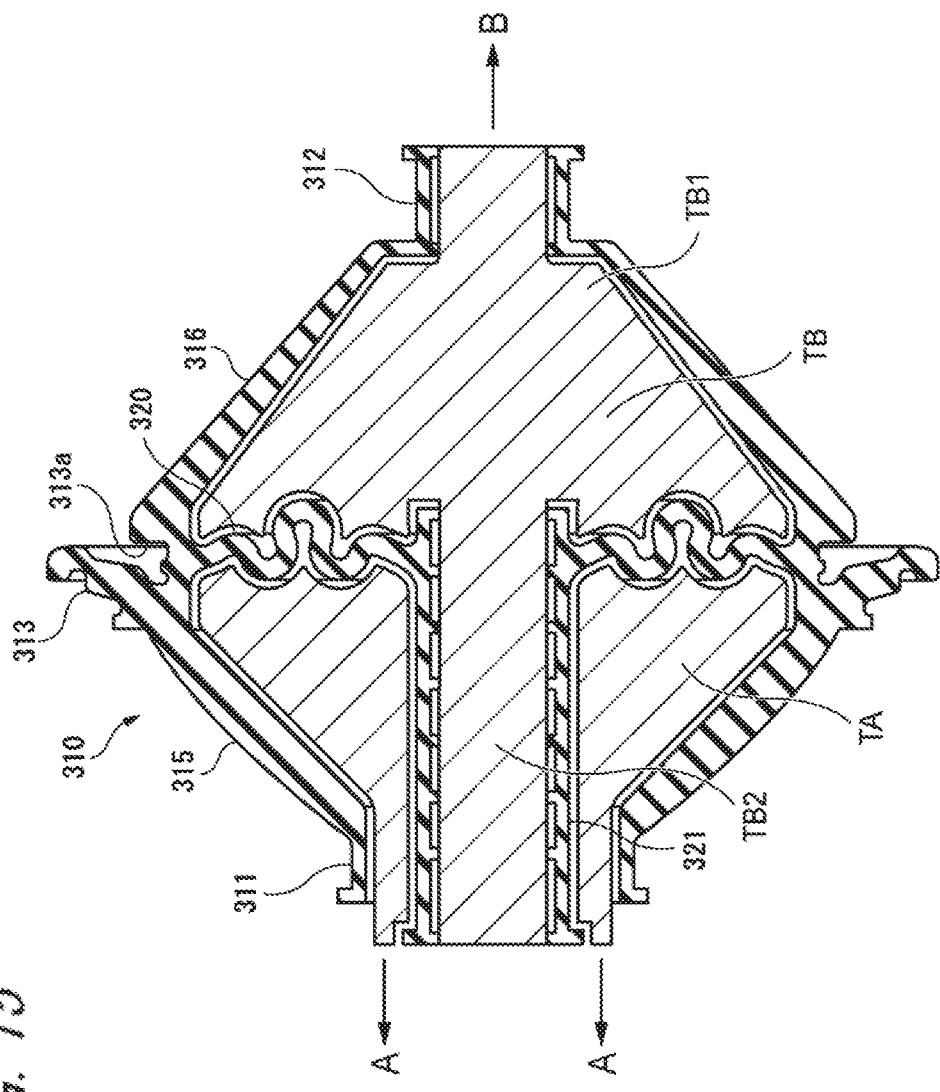
FIG. 15 is a sectional view showing the relation between an internal mold used for manufacturing the grommet and the grommet.

FIG. 15 shows the relation between the grommet 310 and the internal mold.

When the grommet 310 according to the embodiment is manufactured, the internal mold for molding the internal shape of the grommet 310 is divided axially into two parts with the sound insulation wall 320 as a boundary. In an internal mold part TB which is one divided mold part, a rod-like mold portion TB2 for forming the inside of the inner cylinder portion 321 is integrated with a body portion TB1.

After the grommet 310 is molded, one internal mold part TA of the divided two internal mold parts TA and TB is removed toward one axial side (in a direction of an arrow A) relatively to the molded grommet 310. In addition, the other internal mold part TB of the divided two internal mold parts TA and TB is removed toward the other axial side (in a direction of an arrow B) relatively to the molded grommet 310. In the aforementioned manner, it is possible to obtain the grommet 310 as a molded article. When the internal mold parts TA and TB divided thus are removed relatively in the opposite directions from the grommet 310, the grommet 310 having an integral structure including the sound insulation wall 320 can be molded easily.

Incidentally, when air is blown into a space between the grommet 310 and each internal mold part TA, TB to expand the grommet 310 during mold release of the internal mold part TA, TB, it is possible to remove the internal mold part TA, TB from the grommet 310 more easily.

Fifth Embodiment

Next, a grommet according to a fifth embodiment will be described.

Figure 16:
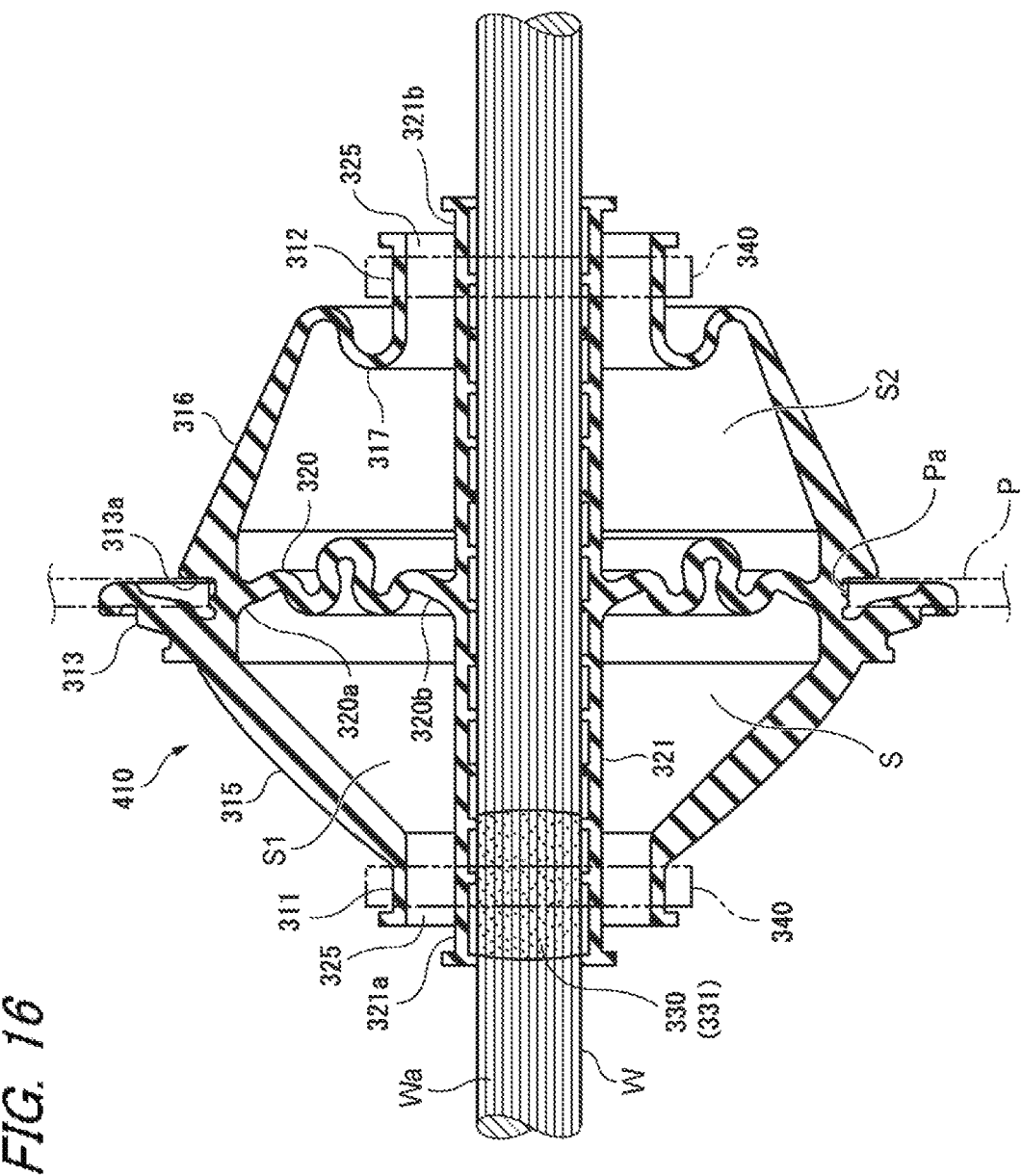
FIG. 16 is a sectional view of a grommet according to a fifth embodiment of the invention.

FIG. 16 is a sectional view of the grommet according to the fifth embodiment. In the grommet 310 according to the fourth embodiment shown in FIG. 14, the inner cylinder portion 321 is formed to be half as long as the entire axial length of the grommet 310. On the other hand, in the grommet 410 according to the fifth embodiment, an inner cylinder portion 321 is extended continuously over an entire length between opposite inner circumferential ends (small diameter cylinder portions 311 and 312) of two tapered cylinder-shaped coupling shield walls 315 and 316. Opposite end portions 321a and 321b of the inner cylinder portion 321 are inserted through the small diameter cylinder portions 311 and 312 at the inner circumferential ends of the coupling shield walls 315 and 316 while keeping annular gaps 325 with respect to inner sides of the small diameter cylinder portions 311 and 312. In addition, in order to relax assembling stress for fitting the grommet 410 to a panel P, an annular curved portion 317 curved in an S-shape is interposed between the coupling shield wall 316 on an insertion side and the small diameter cylinder portion 312. The remaining configuration is the same as that in the fourth embodiment. Accordingly, constituent members the same as those in the fourth embodiment are referred to by the same signs correspondingly and respectively, and description thereof will be omitted.

According to the grommet 410 according to the fifth embodiment, it is possible to obtain the same effect as that obtained by the grommet 310 according to the fourth embodiment. Besides that, due to the inner cylinder portion 321 which is extended axially from the middle (a position of a panel fixation portion) not toward only one side but toward the opposite sides in the grommet 410, it is possible to improve tight contact properties between a wire harness W and the inner cylinder portion 321.

Figure 17:
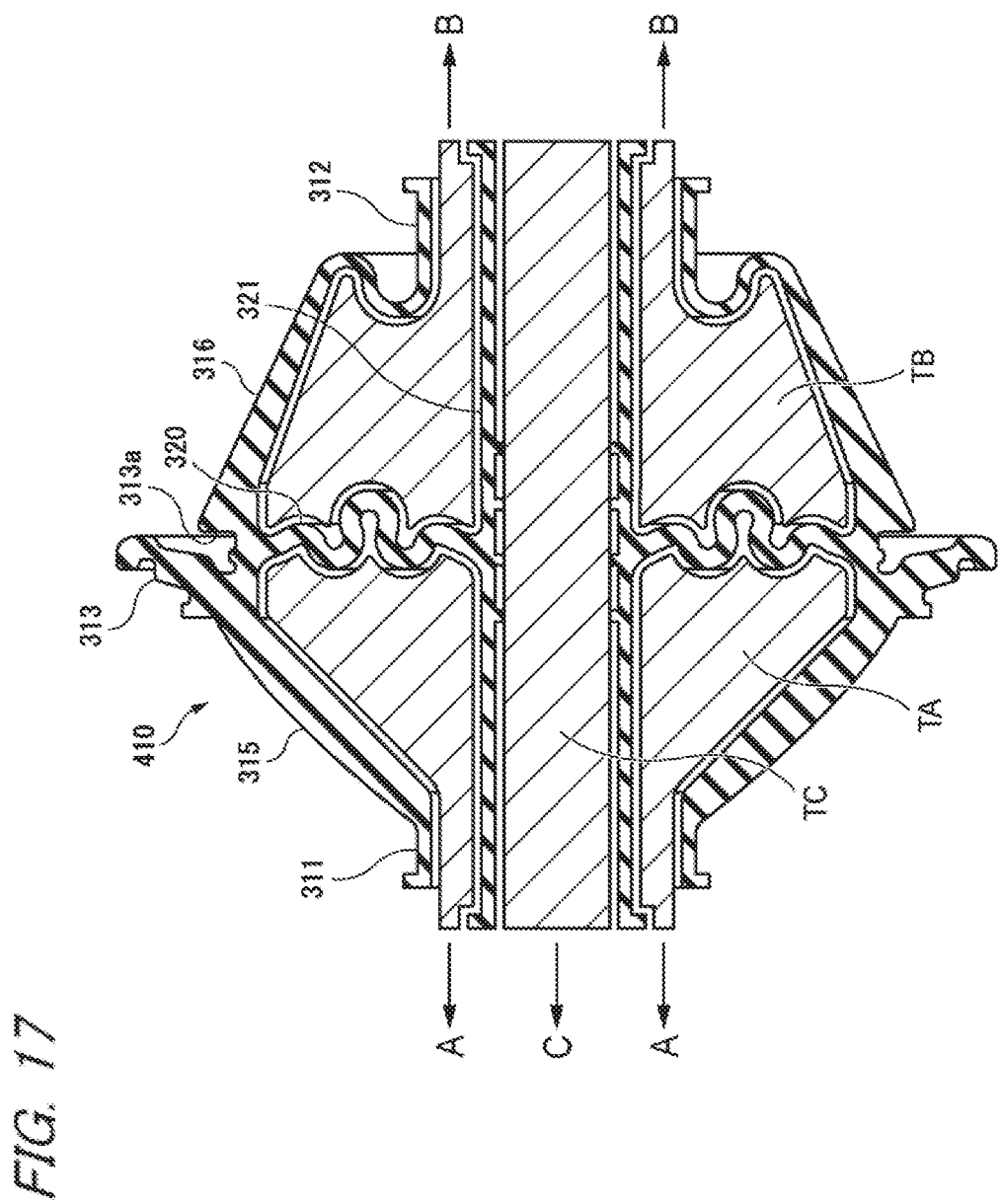
FIG. 17 is a sectional view showing the relation between an internal mold used for manufacturing the grommet and the grommet.

The following internal mold is used for manufacturing the grommet 410 according to the fifth embodiment. FIG. 17 shows the relation between the grommet 410 and the internal mold.

Three internal mold parts for molding an internal shape of the grommet 410 are used for manufacturing the grommet 410 according to the fifth embodiment. That is, the internal mold for forming a sound insulation space S is divided axially into two parts with a sound insulation wall 320 as a boundary so that a first internal mold part TA on one axial side and a second internal mold part TB on the other axial side can be used. Further, a third internal mold part TC for molding an inner circumference of the inner cylinder portion 321 is used.

After the grommet 410 has been molded by such three first to third mold parts TA, TB and TC, the first internal mold part TA of the divided two internal mold parts TA and TB is removed toward the one axial side (in a direction of an arrow A) relatively to the molded grommet 410. In addition, the second internal mold part TB of the divided two internal mold parts TA and TB is removed toward the other axial side (in a direction of an arrow B) relatively to the molded grommet 410. In addition, the third internal mold part TC is removed toward one side (in a direction of an arrow C) or toward the other side. In the aforementioned manner, it is possible to obtain the grommet 410 as a molded article.

When the grommet 410 has been manufactured thus, the molded sound insulation wall 320 is not an obstacle but the divided internal mold parts TA and TB can be removed relatively from the grommet 410. Accordingly, it is possible to easily mold the grommet 410 having an integral structure including the sound insulation wall 320.

Also in this case, when air is blown into a space between the grommet 410 and each internal mold part TA, TB, TC to expand the grommet 410 during mold release of the internal mold part TA, TB, TC, it is possible to remove the internal mold part TA, TB, TC from the grommet 410 more easily.

Sixth Embodiment

Next, a grommet according to a sixth embodiment will be described.

Figure 18:
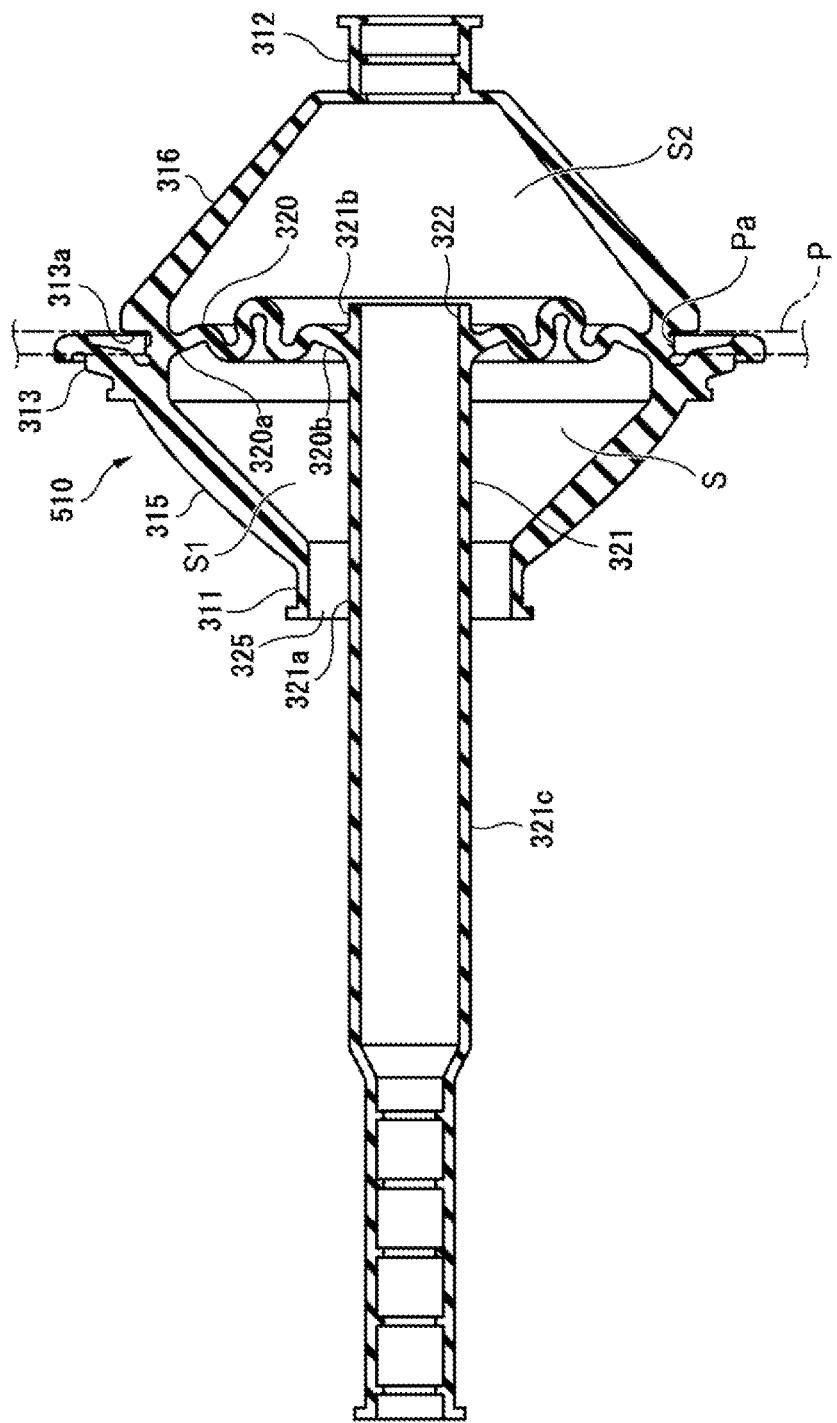
FIG. 18 is a sectional view of a grommet according to a sixth embodiment of the invention.
Figure 19:
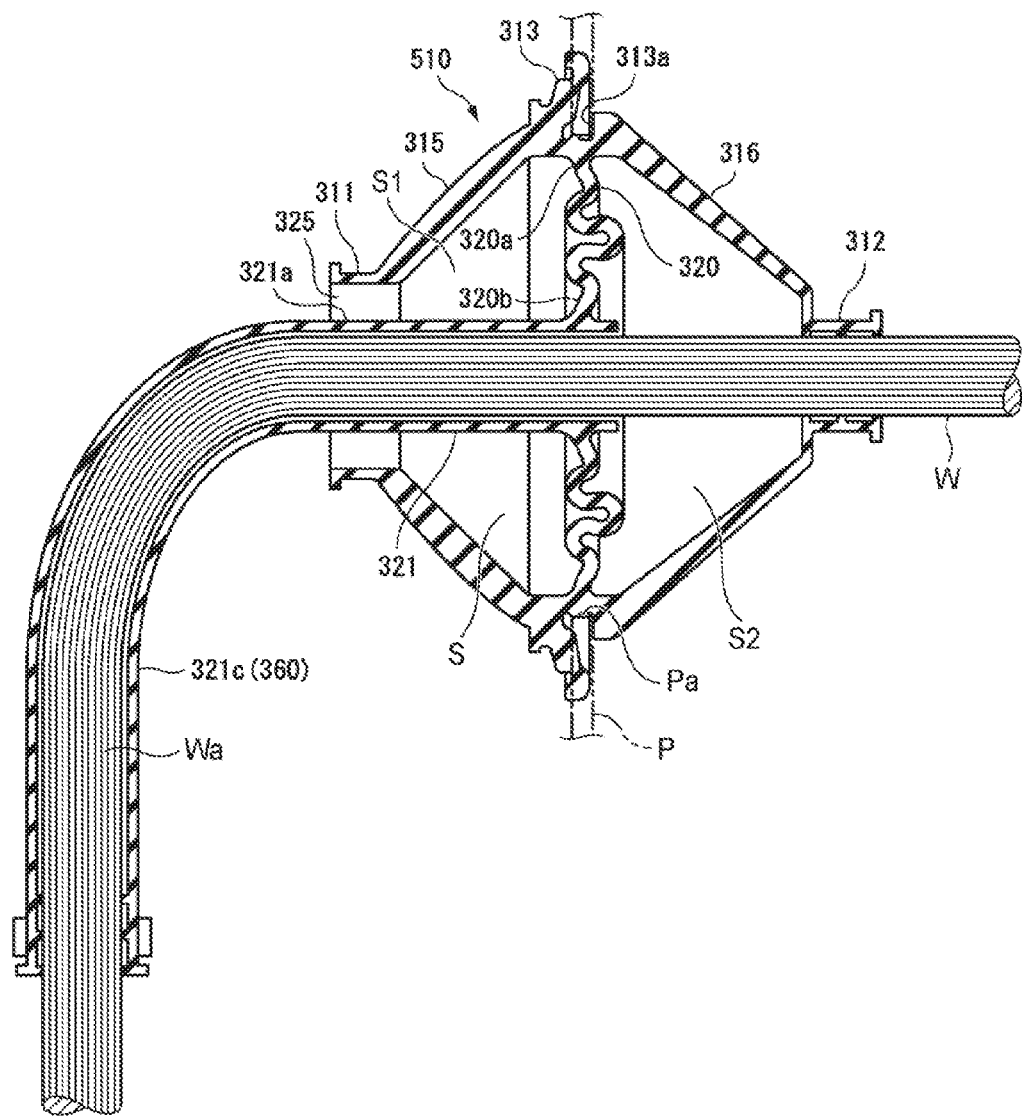
FIG. 19 is a sectional view of a usage state of the grommet.

FIG. 18 is a sectional view of the grommet according to the sixth embodiment. FIG. 19 is a sectional view of a usage state of the grommet.

As shown in FIG. 18, the grommet 510 according to the sixth embodiment has an extended cylinder portion 321c which is provided in the end portion 321a of the inner cylinder portion 321 of the grommet 310 according to the fourth embodiment shown in FIG. 14. That is, the extended cylinder portion 321c is provided in the end portion 321a (an end portion of a side facing a water-wetted environment such as an engine room) of the inner cylinder portion 321 which has been inserted into an inner circumferential end (small diameter cylinder portion 311) of a coupling shield wall 315, so that the extended cylinder portion 321c can be bent downward to extend long in use as shown in FIG. 19 so as to prevent water from entering from the outside.

The extended cylinder portion 321c in a posture hanging down as described above is provided to extend in the inner cylinder portion 321. In this manner, it is possible to prevent moisture from intruding into the extended cylinder portion 321c easily due to a capillary phenomenon etc. through gaps among electric wires Wa. This portion corresponds to a water sealing portion 360. In this case, since a water sealant 331 is not used, a step of injecting the water sealant 331 can be dispensed with. The remaining configuration and effects are the same as those according to the fourth embodiment. Accordingly, constituent members the same as those according to the fourth embodiment are referred to by the same signs correspondingly and respectively, and description thereof will be omitted.

Incidentally, the example shown in FIG. 18 is shown as a modification in a case where the inner cylinder portion 321 extends to be half as long as an entire length between opposite inner circumferential ends (small diameter cylinder portions 311 and 312) of two coupling shield walls 315 and 316. However, the inner cylinder portion 321 may extend over the entire length between the opposite inner circumferential ends (small diameter cylinder portions 311 and 312) of the two coupling shield walls 315 and 316 as in the fifth embodiment.

The invention is not limited to the aforementioned embodiments but modification, improvement, etc. can be made thereon suitably. In addition, as long as the invention can be achieved, the materials, shapes, dimensions, numbers, arrangement places, etc. of the respective constituent members in the aforementioned embodiments are not limited but can be changed desirably.

For example, the grommet provided with the inner cylinder portion 321 and the sound insulation wall 320 has been described in the aforementioned embodiment. The invention can be applied also to a grommet from which the inner cylinder portion 321 has been removed. The grommet in this case has a large diameter cylinder portion or coupling shield walls in the same manner as in the fourth embodiment in FIG. 14, and has small diameter cylinder portions at inner circumferential ends of the two coupling shield walls. A water sealing portion is provided in at least one small diameter cylinder portion of the two small diameter cylinder portions so that gaps among electric wires of a wire harness to which the small diameter cylinder portion is tightly fitted and a gap between the electric wires and an inner circumference of the small diameter cylinder portion can be sealed with a water sealant in the water sealing portion. With the configuration made thus, it is possible to provide sound insulation properties and water sealing properties.

In addition, a sound insulation wall is provided inside a sound insulation space so that the sound insulation wall having an outer circumferential end coupled to an inner circumference of the large diameter cylinder portion or to an inner circumference of one of the coupling shield walls in a position close to the inner circumference of the large diameter cylinder portion, and an inner circumference end making tight contact with an outer circumference of the wire harness can divide the sound insulation space axially. Accordingly, it is possible to improve the sound insulation properties greatly.

Here, the aforementioned characteristics of the embodiments of the grommet and the aforementioned characteristics of the method for manufacturing the grommet according to the invention are summarized briefly and listed in the following items (1) to (17) respectively.

(1) A grommet (10, 10A, 50) which is fixed to a wire harness (WH) to be inserted through an opening portion (1) of a panel (P), and which is then fitted and mounted in the opening portion (1) so that the grommet (10, 10A, 50) can support the wire harness (WH) in the panel (P), the grommet (10, 10A, 50) including:

a circumferential wall (partition wall 21, 22, 61, 62) which covers the circumference of the wire harness (WH) to thereby form a sound insulation space (S) around the wire harness (WH); and a soundproof wall (25, 75) which is formed inside the sound insulation space (S) so as to intersect with a longitudinal direction of the wire harness (WH).

(2) A grommet according to the aforementioned item (1), wherein: a plurality of the soundproof walls (25) are formed in parallel at intervals.

(3) A grommet according to the aforementioned item (2), wherein: a sound absorbing material (31) is provided among the soundproof walls (25).

(4) A grommet according to any one of the aforementioned items (1) through (3), wherein: the soundproof wall or walls (25) have a through hole or through holes (25a) penetrated by the wire harness (WH), and the wire harness (WH) and the through hole or through holes (25a) are brought into tight contact with each other.

(5) A grommet according to the aforementioned item (1), further including:

a long cylinder portion (54) which is mounted on an outer circumference of the wire harness (WH); wherein:

a pair of the circumferential walls (61, 62) which are formed into conical shapes having diameters gradually smaller as their distances from a panel fixation portion (53) mounted in the opening portion (1) of the panel (P) are larger are provided on axially opposite sides of the panel fixation portion (53);

inner circumferential ends (circular cylinder portions 51, 52) of the circumferential walls (61, 62) separated at maximum distances from the panel fixation portion (53) are disposed adjacently to an outer circumference of the long cylinder portion (54) in a non-contact state so that the sound insulation space (S) can be defined between the long cylinder portion (54) and the circumferential walls (61, 62); and an outer circumferential end (75a) of the soundproof wall (75) is connected to an inner circumference of the panel fixation portion (53) and an inner circumferential end (75b) of the soundproof wall (75) is connected to the outer circumference of the long cylinder portion (54), so that the sound insulation space (S) is divided axially by the soundproof wall (75).

(6) A grommet according to the aforementioned item (5), wherein: the soundproof wall (75) is formed as an annular corrugated wall.

(7) A grommet according to any one of the aforementioned items (1) through (6), wherein:

the sound insulation space (S) is divided into a plurality of sections in an axial direction by the soundproof wall or walls (25, 75); and all cancellation frequencies at which sound waves can cancel each other due to reflection in the axial direction within the divided sound insulation space sections (S1, S2) are included in a target frequency band of sound waves to be attenuated.

(8) A grommet according to the aforementioned item (7), wherein: a ratio between axial lengths (L1, L2) of two sound insulation space sections (S1, S2) of the plurality of divided sound insulation space sections (S1, S2) is set at 2:1.

(9) A method for manufacturing a grommet according to any one of the aforementioned items (1) through (8), wherein:

an internal mold for molding an internal shape of the grommet (10, 10A, 50) is axially divided into two parts with the soundproof wall (25, 75) as a boundary, one internal mold part (40A, 41A, 80A) of the divided two internal mold parts is removed toward one side relatively to the molded grommet (10, 10A, 50) after the grommet (10, 10A, 50) is molded, and the other internal mold part (40B, 41B, 80B) of the divided two internal mold parts is removed toward the other side relatively to the molded grommet (10, 10A, 50).

(10) A grommet (201) including:

a large diameter cylinder portion (211) which is provided with a panel engagement portion (212) at its outer circumference, the panel engagement portion (212) being engaged with an inner circumferential edge of a through hole (Pa) of a panel (P);

two small diameter cylinder portions (213, 214) which are disposed on axially opposite sides of the large diameter cylinder portion (211) and tightly fitted to an outer circumference of a cable (W) passed through the through hole (Pa) respectively; and two coupling shield walls (215, 216) which have outer circumference edges connected to the large diameter cylinder portion (211) and inner circumferential edges connected to the small diameter cylinder portions (213, 214), so that the coupling shield walls (215, 216) shield annular spaces between the large diameter cylinder portion (211) and the small diameter cylinder portions (213, 214) respectively;

the large diameter cylinder portion (211), the two small diameter cylinder portions (213, 214), and the two coupling shield walls (215, 216) forming a grommet body (210), which is made of an elastic material; wherein:

a sound insulation plate (230) which is formed separately from the grommet body (210) and tightly fitted to the outer circumference of the cable (W) is disposed inside the grommet body (210) to thereby partition the inside of the grommet body (210) into a plurality of hermetically sealed spaces (S1, S2);

an annular fitting groove (220) is formed internally in the grommet body (210), and an outer circumferential edge (231) of the sound insulation plate (230) integrated with the cable (W) is fitted to the fitting groove (220); and the fitting groove (220) is provided in an inner circumferential side position corresponding to the panel engagement portion (212).

(11) A grommet (310, 410) which is fixed to a wire harness (W) to be inserted through a through hole (Pa) of a panel (P), and which is fitted into the through hole (Pa) so as to be mounted in the panel (P) so that the grommet (310, 410) can support the wire harness (W) in the panel (P), the grommet (310, 410) including:

a large diameter cylinder portion (313) which is provided with a panel fixation portion (engagement groove 313a) fixed to the through hole (Pa) of the panel (P);

two small diameter cylinder portions (311, 312) which are disposed on axially opposite sides of the large diameter cylinder portion (313) respectively and tightly fitted to an outer circumference of the wire harness (W) passed through the through hole (Pa); and two coupling shield walls (315, 316) which define an annular sound insulation space (S) between the large diameter cylinder portion (313) and the small diameter cylinder portions (311, 312); wherein:

a water sealing portion (330) is provided in at least one small diameter cylinder portion of the two small diameter cylinder portions (311, 312) so that gaps among electric wires of the wire harness (W) to which the small diameter cylinder portion is tightly fitted and a gap between the electric wires and an inner circumference of the small diameter cylinder portion (311, 312) can be sealed with a water sealant (311) in the water sealing portion (330).

(12) A grommet (310, 410) according to the aforementioned item (11), wherein:

a sound insulation plate (320) is provided inside the sound insulation space (S) so that the sound insulation plate (320) which has an outer circumferential end (320a) coupled to an inner circumference of the large diameter cylinder portion (313) or to an inner circumference of one of the coupling shield walls (315, 316) in a position close to the inner circumference of the large diameter cylinder portion (313), and an inner circumferential end (320b) making tight contact with the outer circumference of the wire harness (W) can divide the sound insulation space (S) axially.

(13) A grommet (310, 410) which is fixed to a wire harness (W) to be inserted through a through hole (Pa) of a panel (P), and which is fitted into the through hole (Pa) so as to be mounted in the panel (P) so that the wire harness (W) is supported in the panel (P), the grommet (310, 410) including:

a large diameter cylinder portion (313) which is provided with a panel fixation portion (engagement groove 313a) fixed to the through hole (Pa) of the panel (P);

two coupling shield walls (315, 316) which extend from the large diameter cylinder portion (313) toward axially opposite sides to have diameters gradually smaller as their distances from the large diameter cylinder portion (313) are larger so that, of the two coupling shield walls (315, 316), inner circumferential ends (small diameter cylinder portions 311, 312) which are consequently small in diameter are disposed adjacently to or in tight contact with an outer circumference of the wire harness (W), and which therefore define a sound insulation space (S) around the wire harness (W);

an inner cylinder portion (321) which has at least one axial side end portion (321a, 321b) inserted into a corresponding one of the inner circumferential ends (small diameter cylinder portions 311, 312) of the coupling shield walls (315, 316) and which is tightly fitted to the outer circumference of the wire harness (W); and a sound insulation wall (320) which is provided inside the sound insulation space (S) and which has an outer circumferential end (320a) coupled to an inner circumference of the large diameter cylinder portion (313) or to an inner circumference of one of the coupling shield walls (315, 316) close to the inner circumference of the large diameter cylinder portion (313), and an inner circumferential end (320b) coupled to the inner cylinder portion (321) so that the sound insulation wall (320) can define the sound insulation space (S) axially; wherein:

a water sealing portion (330) is provided in the inner cylinder portion (321) so that gaps among electric wires (Wa) of the wire harness (W) to which the inner cylinder portion (321) is tightly fitted and a gap between the electric wires (Wa) and an inner circumference of the inner cylinder portion (321) can be sealed with a water sealant (331) in the water sealing portion (330).

(14) A grommet (310) according to the aforementioned item (13), wherein: the inner cylinder portion (321) extends continuously over one half of an entire length between the opposite inner circumferential ends (small diameter cylinder portions 311, 312) of the two coupling shield walls (315, 316), one side end portion (321a) of the inner cylinder portion (321) is inserted into the inner circumferential end (small diameter cylinder portion 311) of the coupling shield wall (315) on the one side, and an opening end (322) of the other side end portion (321b) of the inner cylinder portion (321) is opened to the inside of the sound insulation space (S).

(15) A grommet (410) according to the aforementioned item (13), wherein: the inner cylinder portion (321) extends continuously over an entire length between the opposite inner circumferential ends (small diameter cylinder portions 311, 312) of the two coupling shield walls (315, 316), and the opposite end portions (321a, 321b) of the inner cylinder portion (321) are inserted into the inner circumferential ends (small diameter cylinder portions 311, 312) of the coupling shield walls (315, 316) respectively.

(16) A grommet (310, 410) according to any one of the aforementioned items (13) to (15), wherein: the water sealing portion (330) is disposed in a position closer to a noise generation side of the axially opposite sides of the panel (P) than the panel fixation portion (engagement groove 313a) of the large diameter cylinder portion (313).

(17) A grommet (510) which is fixed to a wire harness (W) to be inserted through a through hole (Pa) of a panel (P), and which is fitted into the through hole (Pa) so as to be mounted in the panel (P) so that the grommet (510) can support the wire harness (W) in the panel (P), the grommet (510) including:

a large diameter cylinder portion (313) which is provided with a panel fixation portion (engagement groove 313a) fixed to the through hole (Pa) of the panel (P);

two coupling shield walls (315, 316) which extend from the large diameter cylinder portion (313) toward axially opposite sides to have diameters gradually smaller as their distances from the large diameter cylinder portion (313) are larger so that, of the two coupling shield walls (315, 316), inner circumferential ends (small diameter cylinder portions 311, 312) which are consequently small in diameter are disposed adjacently to or in tight contact with on an outer circumference of the wire harness (W), and which therefore define a sound insulation space (S) around the wire harness (W);

an inner cylinder portion (321) which has at least one axial side end portion (321a, 321b) inserted into a corresponding one of the inner circumferential ends (small diameter cylinder portions 311, 312) of the coupling shield walls (315, 316) and which is tightly fitted to the outer circumference of the wire harness (W); and a sound insulation wall (320) which is provided inside the sound insulation space (S) and which has an outer circumferential end (320a) coupled to an inner circumference of the large diameter cylinder portion (313) or to an inner circumference of one of the coupling shield walls (315, 316) close to the inner circumference of the large diameter cylinder portion (313), and an inner circumferential end (313b) coupled to the inner cylinder portion (321) so that the sound insulation wall (320) can divide the sound insulation space (S) axially; wherein:

an extended cylinder portion (320c) which is provided in the end portion (321a) of the inner cylinder portion (321) inserted into the inner circumferential end (small diameter cylinder portion 311) of the coupling shield wall (315) so that the extended cylinder portion (321c) can extend downward to prevent water from entering from the outside.

Although the invention has been described in detail by referring to the particular embodiments, it is apparent to those skilled in the art that various changes and modifications are possible without departing from the spirit and scope of the invention.

According to the invention, it is possible to obtain an effect that a soundproof effect can be enhanced without increasing the size. The invention which can obtain the effect is useful for a grommet and a method for manufacturing the same.

What is claimed is:

1. A grommet which is fixed to a wire harness to be inserted through an opening portion of a vehicle panel, and which is then fitted and mounted in the opening portion so that the wire harness is supported in the vehicle panel, the grommet including:
   a panel fixation portion mounted in the opening portion of the vehicle panel,
   circumferential walls which cover the circumference of the wire harness to form a sound insulation space around the wire harness; and
   soundproof walls formed inside the sound insulation space so as to intersect with a longitudinal direction of the wire harness,
   wherein: the soundproof walls have through holes penetrated by the wire harness, and the wire harness and the through holes are brought into tight contact with each other, and
   an outer circumference of the soundproof walls and through holes are positioned at an inner circumferential side of the panel fixation portion.

2. A grommet according to claim 1, wherein: the soundproof walls are formed in parallel at intervals.

3. A grommet according to claim 2, wherein: a sound absorbing material is provided among the soundproof walls.

4. A grommet according to claim 1, further including:
   a long cylinder portion which is mounted on an outer circumference of the wire harness; wherein:
   the circumferential walls include a pair of circumferential walls which are formed into conical shapes having diameters gradually smaller as their distances from the panel fixation portion mounted in the opening portion of the vehicle panel are larger are provided on axially opposite sides of the panel fixation portion;
   inner circumferential ends of the circumferential walls separated at maximum distances from the panel fixation portion are disposed adjacently to an outer circumference of the long cylinder portion in a non-contact state so that the sound insulation space can be defined between the long cylinder portion and the circumferential walls; and
   an outer circumferential end of each soundproof wall is connected to an inner circumference of the panel fixation portion and an inner circumferential end of each soundproof wall is connected to the outer circumference of the long cylinder portion, so that the sound insulation space is divided axially by the soundproof wall.

5. A grommet according to claim 4, wherein: each soundproof wall is formed as an annular corrugated wall.

6. A grommet according to claim 1, wherein:
   the sound insulation space is divided into a plurality of sections in an axial direction by the soundproof walls; and
   all cancellation frequencies at which sound waves can cancel each other due to reflection in the axial direction within the divided sound insulation space sections are included in a target frequency band of sound waves to be attenuated.

7. A method for manufacturing a grommet according to claim 1, wherein:
   an internal mold for molding an internal shape of the grommet is axially divided into two parts with the soundproof walls as a boundary, one internal mold part of the divided two internal mold parts is removed toward one side relatively to the molded grommet after the grommet is molded, and the other internal mold part of the divided two internal mold parts is removed toward the other side relatively to the molded grommet.

8. A grommet including:
   a large diameter cylinder portion which is provided with a panel engagement portion at its outer circumference, the panel engagement portion being engaged with an inner circumferential edge of a through hole of a vehicle panel;
   two small diameter cylinder portions which are disposed on axially opposite sides of the large diameter cylinder portion and tightly fitted to an outer circumference of a cable passed through the through hole respectively; and
   two coupling shield walls which have outer circumferential edges connected to the large diameter cylinder portion and inner circumferential edges connected to the small diameter cylinder portions, so that the coupling shield walls shield annular spaces between the large diameter cylinder portion and the small diameter cylinder portions respectively;

the large diameter cylinder portion, the two small diameter cylinder portions, and the two coupling shield walls forming a grommet body, which is made of an elastic material; wherein:

a sound insulation plate which is formed separately from the grommet body and tightly fitted to the outer circumference of the cable is disposed inside the grommet body to partition the inside of the grommet body into a plurality of hermetically sealed spaces;

an annular fitting groove is formed internally in the grommet body, and an outer circumferential edge of the sound insulation plate integrated with the cable is fitted to the annular fitting groove; and the annular fitting groove is provided in an inner circumferential side position corresponding to the panel engagement portion.

9. A grommet which is fixed to a wire harness to be inserted through a through hole of a vehicle panel, and which is fitted into the through hole so as to be mounted in the vehicle panel so that the wire harness is supported in the vehicle panel, the grommet including:

a large diameter cylinder portion which is provided with a panel fixation portion fixed to the through hole of the vehicle panel;

two coupling shield walls which extend from the large diameter cylinder portion toward axially opposite sides to have diameters gradually smaller as their distances from the large diameter cylinder portion are larger so that, of the two coupling shield walls, inner circumferential ends are disposed adjacently to or in tight contact with an outer circumference of the wire harness, and which therefore define a sound insulation space around the wire harness;

an inner cylinder portion which has at least one axial side end portion inserted into a corresponding one of the inner circumferential ends of the coupling shield walls and which is tightly fitted to the outer circumference of the wire harness; and a sound insulation wall which is provided inside the sound insulation space and which has an outer circumferential end coupled to an inner circumference of the large diameter cylinder portion or to an inner circumference of one of the coupling shield walls close to the inner circumference of the large diameter cylinder portion, and an inner circumferential end coupled to the inner cylinder portion so that the sound insulation wall defines the sound insulation space axially, wherein:

a water sealing portion is provided partially on one side of the panel fixation portion in the inner cylinder portion so that gaps among electric wires of the wire harness to which the inner cylinder portion is tightly fitted and a gap between the electric wires and an inner circumference of the inner cylinder portion is sealed with a water sealant in the water sealing portion.

* * * * *